United States Patent
Fukayama et al.

(10) Patent No.: US 10,614,830 B2
(45) Date of Patent: Apr. 7, 2020

(54) SYSTEM, METHOD, AND COMPUTER PROGRAM FOR ESTIMATION OF TARGET VALUE

(71) Applicant: National Institute of Advanced Industrial Science and Technology, Tokyo (JP)

(72) Inventors: Satoru Fukayama, Tsukuba (JP); Masataka Goto, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 16/070,144

(22) PCT Filed: Jan. 13, 2017

(86) PCT No.: PCT/JP2017/001070
§ 371 (c)(1),
(2) Date: Jul. 13, 2018

(87) PCT Pub. No.: WO2017/122798
PCT Pub. Date: Jul. 20, 2017

(65) Prior Publication Data
US 2019/0027162 A1 Jan. 24, 2019

(30) Foreign Application Priority Data
Jan. 14, 2016 (JP) .................. 2016-005219

(51) Int. Cl.
*G06F 17/00* (2019.01)
*G10L 25/51* (2013.01)
(Continued)

(52) U.S. Cl.
CPC .............. *G10L 25/51* (2013.01); *G06N 7/005* (2013.01); *G06N 20/00* (2019.01); *G06N 20/10* (2019.01);
(Continued)

(58) Field of Classification Search
CPC ......... G10L 25/45; G10L 25/51; G06N 7/005; G06N 7/00; G06N 20/00
See application file for complete search history.

(56) References Cited

U.S. PATENT DOCUMENTS

| | | | | |
|---|---|---|---|---|
| 2012/0016822 | A1* | 1/2012 | Kobayashi | G06N 20/00 706/12 |
| 2013/0138428 | A1* | 5/2013 | Chandramouli | G06F 17/274 704/9 |

FOREIGN PATENT DOCUMENTS

| | | |
|---|---|---|
| JP | 09-297176 | 11/1997 |
| JP | 2015-108898 | 6/2015 |

OTHER PUBLICATIONS

Schmidt et al., Prediction of Time-Varying Musical Mood Distributions From Audio, all pages, ISMIR 2010 (Year: 2010).*
(Continued)

*Primary Examiner* — Fan S Tsang
*Assistant Examiner* — David Siegel
(74) *Attorney, Agent, or Firm* — Rankin, Hill & Clark LLP

(57) ABSTRACT

A system, method, and computer program for estimation of a target value, which can change the aggregation of estimation results based on the degrees of confidence, taking the nature of an input observation signal into consideration. An unknown observation signal is input to a plurality of regression models. A plurality of estimated values are respectively obtained by a plurality of regression models corresponding to the plurality of features of the unknown observation signal. A target value of the unknown observation signal is
(Continued)

estimated by aggregation of the target values. The estimating section calculates weights to be added the estimation results output from the regression models, based on the degrees of confidence with respect to the inputs into the regression models. A target value of the unknown observation signal is estimated through the aggregation by calculating a weighted sum of the estimation results output from the regression models.

16 Claims, 17 Drawing Sheets

(51) Int. Cl.
G06N 20/10 (2019.01)
G06N 20/00 (2019.01)
G06N 7/00 (2006.01)
G10L 25/45 (2013.01)
G06N 3/04 (2006.01)

(52) U.S. Cl.
CPC ............ *G10L 25/45* (2013.01); *G06N 3/0445* (2013.01); *G06N 3/0454* (2013.01)

(56) References Cited

OTHER PUBLICATIONS

Yang et al., A Regression Approach to Music Emotion Recognition, all pages, IEEE Transactions on Audio Speech and Language Processing • Mar. 2008 (Year: 2008).*
Markov et al. Music Genre and Emotion Recognition Using Gaussian Processes, all pages, IEEE Access 2014 (Year: 2014).*
Schmidt, E. and Kim, Y.E.: "Prediction of Time-Varying Musical Mood Distributions from Audio", 11th International Society for Music Information Retrieval Conference (2010), Listed in International Search Report, 6 pages.
Fukayama, S. and Goto, M.: "Music Emotion Recognition with Adaptive Aggregation of Gaussian Process Regressors", ICASSP 2016 (Mar. 2016), Listed in International Search Report, 5 pages.
J.A. Russel: "A circumplex Model of Affect", Journal of Personality and Social Psychology, vol. 39, pp. 1161-1178, Jun. 1980, Discussed in specification, 18 pages.
M. Soleymani, M. N. Caro, E. M. Schmidt, and Y. H. Yang: "The MediaEval 2013 Brave New Task: Emotion in Music", Proceedings of MediaEval 2013 Workshop, 2013, Discussed in specification, 2 pages.
Aljanaki, Y. H. Yang, and M. Soleymani: "Emotion in Music Task at MediaEval 2014", Proceedings of MediaEval 2014 Workshop, 2014, Discussed in specification, 2 pages.
J. Posner, J.A. Russel, and B. S. Peterson: "The circumplex model of affect: An integrative approach to affective neuroscience, cognitive development, and psychology", Development and Psychopathology, vol. pp. 715-734, Sep. 2005, Discussed in specification, 25 pages.
P. C. Trimmer, E. S. Paul, M. T. Mendl, J. M. McNamara, and A. Houston: "On the Evolution and Optimality of Mood States", Behavioral Sciences, vol. 3, pp. 501-521, 2013, Discussed in specification, 21 pages.
T. Eerola, O. Lartillot, and P. Toiviainen: "Prediction of multidimensional emotional ratings in music from audio using multivariate regression models", Proceedings of ISMIR 2009, 2009, pp. 621-626, Discussed in specification, 6 pages.
A. Aljanaki, F. Wiering, and R. C. Veltkamp: "MIRUtecht participation in MediaEval 2013: Emotion in Music task", Proceedings of MediaEval 2013 Workshop, 2013, Discussed in specification, 2 pages.
E. M. Schmidt, D. Tumbull, and Y. E. Kim: "Feature Selection for Content-Based, Time-Varying Musical Emotion Regression", Proceedings of MIR 2010, 2010, pp. 267-273, Discussed in specification, 7 pages.
E. M. Schmidt and Y. E. Kim: "prediction of Time-Varying Musical Mood Distributions from Audio", Proceedings of ISMIR 2010, 2010, pp. 465-470, Discussed in specification, 6 pages.
Y. Fan and M. Xu, MediaEval 2014: "THU-HCSIL Approach to Emotion in Music Task using Multi-level Regression", Proceedings of MediaEval 2014 Workshop 2014, Discussed in specification, 2 pages.
F. Weninger, F. Eyben, and B. Schuller: "The TUM Approach to the MediaEval Music Emotion Task Using Generic Affective Audio Features", Proceedings of MediaEval 2013 Workshop, 2013, Discussed in specification, 2 pages.
E. Coutinho, F. Weninger, B. Schuller, and K. R. Scherer: "The Munich LSTM-RNN Approach to the MediaEval 2014 "Emotion in Music" Task", Proceedings of MediaEval 2014 Workshop, 2014, Discussed in specification, 2 pages.
V. Imbrasaite and P. Robinson: "Music Emotion Tracking with Continuous Conditional Neural Fields and Relative Representation", Proceedings of MediaEval 2014 Workshop, 2014, Discussed in specification, 2 pages.
B. Han, S. Rho, R. B. Dannenberg, and E. Hwang: "SMERS: Music Emotion Recognition Using Support Vector Regression", Proceedings of ISMIR 2009, 2009, pp. 651-656, Discussed in specification, 7 pages.
K. Markov and T. Matsui: "Music Genre and Emotion Recognition Using Gaussian Processes", IEEE Access, vol. 2, pp. 688-697, Jun. 2014, Discussed in specification, 10 pages.
K. Markov and T. Matsui: "Dynamic Music Emotion Recognition Using State-Space Models", Proceedings of MediaEval 2014 Workshop, 2014, Discussed in specification, 2 pages.
International Search Report, dated Mar. 28, 2017 (Mar. 28, 2017), 2 pages.

\* cited by examiner

FIG.4

| Audio Signal Segment | | Music Emotion Value | |
|---|---|---|---|
| | 30 seconds | Valence Value (−1.0 or more and 1.0 or less) | Arousal Value (−1.0 or more and 1.0 or less) |
| Audio Signal Segment $S_1$ | | $V_1 = 0.2$ | $A_1 = -0.6$ |
| Audio Signal Segment $S_2$ | | $V_2 = -0.7$ | $A_2 = -0.1$ |
| Audio Signal Segment $S_3$ | | $V_3 = 0.3$ | $A_3 = 0.7$ |
| ⋮ | ⋮ | | ⋮ |
| Audio Signal Segment $S_N$ | | $V_N = 0.5$ | $A_N = 0.3$ |

Music Emotion Value
(Valence Value or Arousal Value)     Kernel Matrix

Interpolate Music Emotion Value for Unknown Value According to
Proximity to Value of Feature Group Calculated from Database Expression for Estimating
Music Emotion Value (Valence Value or Arousal Value)

FIG.17

| Method | $R^2$ | RMSE |
|---|---|---|
| (1) Aggregation by GP Regressors based on Degree of Confidence | 0.636 ± 0.040 | 0.206 ± 0.014 |
| (2) Aggregation by GP Regressors with Fixed Weights | 0.619 ± 0.042 | 0.211 ± 0.014 |
| (3) Single GP Regressor | 0.488 ± 0.027 | 0.238 ± 0.053 |

| Method | $R^2$ | RMSE |
|---|---|---|
| (1) Aggregation by GP Regressors based on Degree of Confidence | 0.413 ± 0.043 | 0.230 ± 0.011 |
| (2) Aggregation by GP Regressors with Fixed Weights | 0.397 ± 0.064 | 0.234 ± 0.013 |
| (3) Single GP Regressor | 0.399 ± 0.073 | 0.233 ± 0.012 |

SYSTEM, METHOD, AND COMPUTER PROGRAM FOR ESTIMATION OF TARGET VALUE

TECHNICAL FIELD

The present invention relates to a system, a method, and a computer program for estimation of a target value.

BACKGROUND ART

There is known technology for estimating a target value that should be obtained for an observation signal, based on the observation signal, such as "music emotion recognition" that estimates, based on a music audio signal, an emotion (a target value) that a listener feels when he/she listens to the music. The music emotion recognition is one of typical examples of such technology. In the conventional studies on music emotion recognition, a focus has been placed on finding effective acoustic features for improving estimation accuracy and proposing a new method of regression between the acoustic features and values indicative of the emotion that is elicited by the music when the listener listens to the music.

In the conventional music emotion recognition, acoustic features are calculated from a music audio signal, and the calculated acoustic features are mapped into a space representing music emotions by using the regression or cluster classification methods. In the field of psychological studies, it has been proposed that the emotion that a human feels should be represented with two-dimensional values of Valence and Arousal (VA values) [Non-patent Document 1]. FIG. 18 illustrates the VA values represented on a two-dimensional plane. In the music emotion recognition, the VA values are analyzed based oil the music audio signal. More specifically, the VA values are estimated for segments of the music audio signal, lasting 30 seconds. This is a problem setting employed in the workshop, Emotion in Music of MediaEval Workshop, in which the participants compete with each other in performance of music emotion recognition algorithm. This problem setting has been leading the recent evaluation campaign of the music emotion recognition [Non-patent Documents 2 and 3]. FIG. 18 illustrates a space of emotion, having the Valence and Arousal values as two-dimensional coordinates and literary annotations of emotion at the individual coordinate points in the space. The inventors have prepared this figure, based on a figure of Non-patent Document 5 redrafted from a figure of Non-patent Document 4, and annotated the figure with Japanese equivalents to the English annotations.

In the conventional studies on music emotion recognition, efforts to find effective acoustic features for improving analysis performance have been made. Methods of mapping the chosen acoustic features into the emotion space using the linear regression such as the multivariate regression analysis [Non-patent Documents 6 and 7] have been proposed. Further, it has come up for discussion to automatically select a combination of effective acoustic features using a feature selecting algorithm [Non-patent Document 8]. Instead of carefully selecting the features, a method based on multi-level regression has been proposed. In the proposed method, regression models, to which the acoustic features are to be input, are constructed in advance, and then another model is used to aggregate estimation results from the individual regression models [Non-patent Documents 9 and 10].

In addition to the above, another proposed approach is to use non-linear regression models and apply non-linear dimensionality reduction. The proposed methods are, for example, analysis using neural networks [Non-patent Documents 11, 12, and 13], analysis using a support vector machine [Non-patent Document 14], and analysis using Gaussian process regression [Non-patent Documents 15 and 16].

Background Art Documents

Non-Patent Documents

Non-patent Document 1: J. A. Russel, "A circumplex model of affect," Journal of Personal Social Psychology, vol. 39, pp. 1161-1178, June 1980.

Non-patent Document 2: M. Soleymani, M. N. Caro, E. M. Schmidt, and Y. H. Yang, "The MediaEval 2013 Brave-new Task: Emotion in Music," in Proceedings of MediaEval 2013 Workshop, 2013.

Non-patent Document 3: Aljanaki, Y. H. Yang, and M. Soleymani, "Emotion in Music task at MediaEval 2014," in Proceedings of MediaEval 2014 Workshop, 2014.

Non-patent Document 4: J. Posner, J. A. Russel, and B. S. Peterson, "The circumplex model of affect: An integrative approach to affective neuroscience, cognitive development, and psychology," Development and Psychopathology, vol. pp. 715-734, September 2005.

Non-patent Document 5: P. C. Trimmer, E. S. Paul, M. T. Mendl, J. M. McNamara, and A. Houston, "On the Evolution and Optimality of Mood States," Behavioral Sciences, vol. 3, pp. 501, 2013.

Non-patent Document 6: T. Eerola, O. Lartillot, and P. Toiviainen, "Prediction of multidimensional emotional ratings in music from audio using multivariate regression models," in Proceedings of ISMIR 2009, 2009, pp. 621-626.

Non-patent Document 7: A. Aljanaki, F. Wiering, and R. C. Veltkamp, "MIRUtecht participation in MediaEval 2013: emotion in music task," in Proceedings of MediaEval 2013 Workshop, 2013.

Non-patent Document 8: E. M. Schmidt, D. Turnbull, and Y. E. Kim, "Feature selection for content-based, time-varying musical emotion regression," in Proceedings of MIR 2010, 2010, pp. 267-273.

Non-patent Document 9: E. M. Schmidt, Eyben, and Y. E. Kim, "Prediction of time-varying musical mood distributions from audio," in Proceedings of ISMIR 2010, 2010, pp. 465-470.

Non-patent Document 10: Y. Fan and M. Xu, MediaEval 2014: THU-HCSIL approach to emotion in music task using multi-level regression," in Proceedings of MediaEval 2014 Workshop, 2014.

Non-patent Document 11: F. Weninger, F. Eyben, and B. Shuller, "The TUM approach to the MediaEval music emotion task using generic affective audio features," in Proceedings of MediaEval 2013 Workshop, 2013.

Non-patent Document 12: E. Coutinho, F. Weninger, B. Schuller, and K. R. Scherer, "The Munich LSTM-RNN approach to the MediaEval 2014 'Emotion in Music' task," in Proceedings of MediaEval 2014 Workshop, 2014.

Non-patent Document 13: V. Imbrasaite and P. Robinson, "Music emotion tracking with continuous conditional neural fields and relative representation," in Proceedings of MediaEval 2014 Workshop, 2014.

Non-patent Document 14: B. Han, S. Rho, R. B. Dannenberg, and E. Hwang, "SMERS: music emotion recognition using support vector regression," in Proceedings of ISMIR 2009, 2009, pp. 651-656.

Non-patent Document 15: K. Markov and T. Matsui, "Music genre and emotion recognition using Gaussian process," IEEE Access, vol. 2, pp. 688-697, June 2014.

Non-patent Document 16: K. Markov and T. Matsui, "Dynamic music emotion recognition using state-space models," in Proceedings of MediaEval 2014 Workshop, 2014.

SUMMARY OF INVENTION

Technical Problem

The multi-level regression and non-linear regression have significantly improved the analysis performance of music emotion recognition. The methods of aggregating estimation results from the individual regression models cannot be changed once the methods of aggregation have been determined by training data. The method of aggregation using a regression model suitable for estimation of a value at a particular location in the AV space may be different from the method of aggregation suitable for estimation of a value at another location in the AV space. The effective features are actually different between one location having a high Arousal value and another location having a low Arousal value. This suggests that changing the method of aggregation of the regression models should be effective for performance improvement.

The conventional method of estimating a target value (an emotion) with high accuracy constructs a plurality of regression models which are trained based on a pair of different features and values indicative of emotions, and aggregates estimation results of the individual regression models to output results. The method of aggregating the estimation results from the individual regression models cannot be changed once the method of aggregation has been determined in the training phase. Thus, the method of aggregation cannot be adapted to the kind of music to be analyzed.

An object of the present invention is to provide a system, a method, and a computer program for estimation of a target value, which can change or vary the aggregation of estimation results based on the degrees of confidence, taking the nature of an input observation signal into consideration.

Solution to Problem

In the present invention, the above-mentioned technical problem is solved using aggregation technology based on the degree of confidence. In an aspect of the present invention, there is provided a system for estimation of a target value. The system comprises an estimator configuring section and an estimating section. The estimator configuring section is operable to extract a plurality of features from each of a plurality of observation signals, and includes a plurality of regression models (regressors) corresponding to the plurality of features. The regression models are optimized based on a plurality of training data comprised of a pair of the extracted features (independent variables) and target values (signal target values) [objective variables] to be estimated for the plurality of observation signals. The estimating section is operable to input an unknown observation signal to the estimator configuring section, to estimate a plurality of target values (feature target values) for the corresponding features of the unknown observation signal using the plurality of the regression models, and to estimate a target value (signal target value) for the unknown observation signal through aggregation of estimation results of the plurality of target values (feature target values) for the corresponding features of the unknown observation signal. The plurality of regression models are each capable of obtaining a probability distribution of the estimation results and a degree of confidence.

In the present invention, the estimating section is operable to obtain respective weights to be added to a plurality of estimation results output from the plurality of regression models, based on the respective degrees of confidence for the inputs to the plurality of regression models, and to estimate the target value (signal target value) for the unknown observation signal by performing the aggregation using a weighted sum of the plurality of estimation results output from the plurality of regression models.

The regression models (regressors) provided in the estimator configuring section have parameters which have been optimized in the training phase. In the training phase, the regression models are optimized by preparing a plurality of observation signals having some relationship with an unknown observation signal and training the regression models corresponding to different features. Thus, the necessary parameters are set such that the training data should be best reproduced. If the unknown observation signal is a music audio signal, the regression models are trained using known music audio signals. The estimating section performs the analysis phase using the trained regression models. The estimating section receives, as an input, an observation signal to be analyzed and obtains a mean value of target values (estimated values), namely, an estimation result and a variance of the target values for each of the regression models. Then, the estimating section calculates respective weights to be added to the estimation results (mean values) output from the individual regression models, based on the degrees of confidence (inverse numbers of the variances) that are then determined by the regression models. Thus, the estimating section estimates a target value for the unknown observation signal by performing the aggregation using a weighted sum of the plurality of estimation results output from the plurality of regression models. In other words, the maximum likelihood estimation is performed using a plurality of estimation results and variances in the estimation results to aggregate the estimation results. The estimation results are obtained from the individual regression models by inputting an unknown observation signal to the regression models and calculating the estimation results for the individual regression models, based on the mean values of probability distributions. The degrees of confidence are calculated for the individual regression models, based on the variances in probability distributions that are obtained using the regression models. The degree of confidence is an inverse number of the variance in probability distributions.

According to the present invention, it is possible to provide a system for estimation of a target value, whereby the aggregation of estimation results can be adapted, based on the degrees of confidence, taking account of the nature of an input observation signal.

Preferably, the estimator configuring section includes a feature extracting section and a regression model creating and storing section. The feature extracting section is operable to extract the plurality of features from each of the plurality of observation signals. The regression model creating and storing section is operable to create and store the plurality of regression models corresponding to the plurality of features. The regression models are optimized, based on the plurality of training data comprised of a pair of the extracted features and target values to be estimated for the plurality of observation signals. Preferably, the estimating section includes a degree-of-confidence calculating section, a weight calculating section, and a weighted-sum calculating and target-value estimating section. The degree-of-confidence calculating section is operable to calculate the degrees of confidence for the inputs to the individual regression models. The weight calculating section is operable to calculate respective weights to be added to the plurality of estimation results output from the individual regression models, based on the calculated degrees of confidence. The weighted-sum calculating and target-value estimating section is operable to estimate the target value for the unknown observation signal by performing the aggregation using the weighted sum of the plurality of estimation results output from the plurality of regression models.

The estimator configuring section and the estimating section may be implemented on a computer. Further, the estimator configuring section and the estimating section may be each comprised of a plurality of processors and a plurality of memories. In such configuration, the feature extracting section, the regression model creating and storing section, the degree-of-confidence calculating section, the weight calculating section, and the weighted-sum calculating and target-value estimating section may be each comprised of at least one processor and at least one memory.

The kind of an observation signal is arbitrary. In the music emotion recognition, the observation signal is a music audio signal, and the target value for the observation signal is a music emotion value. It has been confirmed that estimation performance can be improved more than ever by calculating the estimation results (mean values) and degrees of confidence using the regression models in respect of the input music audio signal and aggregating the estimation results through the maximum likelihood estimation using the calculated estimation results and degrees of confidence.

As the regression models, those models that employ Gaussian process, Kriging method, or Bayesian estimation may be employed. Especially, with the Gaussian process regression model, mathematical formulation is facilitated. The Gaussian process regression model is capable of estimating the distribution of estimated values as a Gaussian distribution and interpreting an inverse number of the variance of probability distributions as the degree of confidence. Therefore, the Gaussian process regression model is suitable for the present invention that performs weighting based on the degrees of confidence. It has been confirmed with experiments that the degree of confidence of the regression model trained for every feature varies according to the music emotion value to be estimated.

A plurality of degrees of confidence obtained from a plurality of regression models may intactly be used as pre-normalized weights in a linear relation. Then, the pre-normalized weights are normalized to sum up to one (1). The normalized result is determined as a weight. With this weight setting, for example, when a variance in features is large and a target value is estimated by the individual regression models using such features, a variance in estimated values will be large, thereby lowering the degree of confidence for an estimated result with respect of the given input. According to the input observation signal, however, the degree of confidence for an output from the regression model may be calculated based on the variance in probability distributions obtained by the regression models. Then, the estimation results (mean values) from the regression models may be added respectively with appropriate weights and the weighted estimation results may be aggregated as a weighted sum. Thus, an appropriate target value for the input observation signal can be obtained. Since the features vary according to the input observation signals, appropriate estimation can be performed while varying the degree of confidence.

Alternatively, the pre-normalized weights may be calculated in a non-linear relation, whereby the higher a plurality of degrees of confidence obtained from a plurality of regression models are, the larger the pre-normalized weights are emphasized to be, and the lower the degrees of confidence obtained from the regression models are, the smaller the pre-normalized weights are emphasized to be. Then, the pre-normalized weights are normalized to sum up to one (1). The normalized result is determined as a weight. With this weight setting, the estimation results having a lower degree of confidence than the maximum degree of confidence are less frequently used in the aggregation, thereby enabling robust estimation.

The music emotion value is a two-dimensional value comprised of Valence and Arousal. Here, the estimating section may be configured to output weighted sums of the two-dimensional values estimated by the regression models as an estimated value for valence and an estimated value for arousal.

The degree of confidence is determined to be higher in a region with a smaller variance in the estimation results of feature groups as obtained using the regression models, and to be lower in a region with a larger variance in the estimation results.

The features may be categorized into a plurality of feature groups. A group is preferably comprised of the features having some relationship with each other. A plurality of regression models may be created for the plurality of feature groups. In this configuration, a regression model specialized for a particular feature group may be trained. For some input observation signals, this configuration can attain higher performance than when the regression models are prepared for all of the features.

When the observation signal is a music audio signal and the target value for the input observation signal is a music emotion value, the analysis accuracy will be increased if the feature groups include at least a temporal feature group, a spectral feature group, a pitch-related feature group, and an amplitude spectral feature group.

Preferably, the estimating section has a function of interpolation of the estimation results according to a proximity of an input value to known input values prepared for the feature groups in the regression models when the input value is different from the known input values. In this configuration, the estimation accuracy can be increased. An arithmetic expression for implementing this function is determined at the time of optimization of the regression models in the training phase.

In another aspect of the present invention, there is provided a method for estimation of a target value.

A method for estimation of a target value according to the present invention comprises the steps of preparing and estimating. In the step of preparing, a plurality of regression models are prepared. A plurality of features are extracted from each of a plurality of observation signals. The regression models correspond to the plurality of features and are optimized based on a plurality of training data comprised of a pair of the extracted features and target values to be estimated for the plurality of observation signals. In the step of estimating, an unknown observation signal is input to the plurality of regression models; a plurality of target values (feature target values) for the corresponding features of the unknown observation signal are estimated, using the plurality of regression models. Then, a target value (signal target value) for the unknown observation signal is estimated through aggregation of estimation results of the plurality of target values. As the regression models, those which are each capable of obtaining a probability distribution of the estimation results and a degree of confidence are used.

According to the present invention, in the step of estimating, respective weights to be added to a plurality of estimation results output from the plurality of regression models are obtained, based on the respective degrees of confidence for the inputs to the individual regression models, and a target value for the unknown observation signal is estimated by performing the aggregation using a weighted sum of the plurality of estimation results output from the individual regression models.

In a further aspect of the present invention, there is provided a computer program recorded in a computer-readable non-transitory recording medium when the method of the present invention is implemented on a computer.

BRIEF DESCRIPTION OF DRAWINGS

FIG. 4 illustrates example training date.

FIG. 17 compares the estimation results for evaluation.

DESCRIPTION OF EMBODIMENTS

[Fundamental Configuration of Embodiments]

Figure 1:
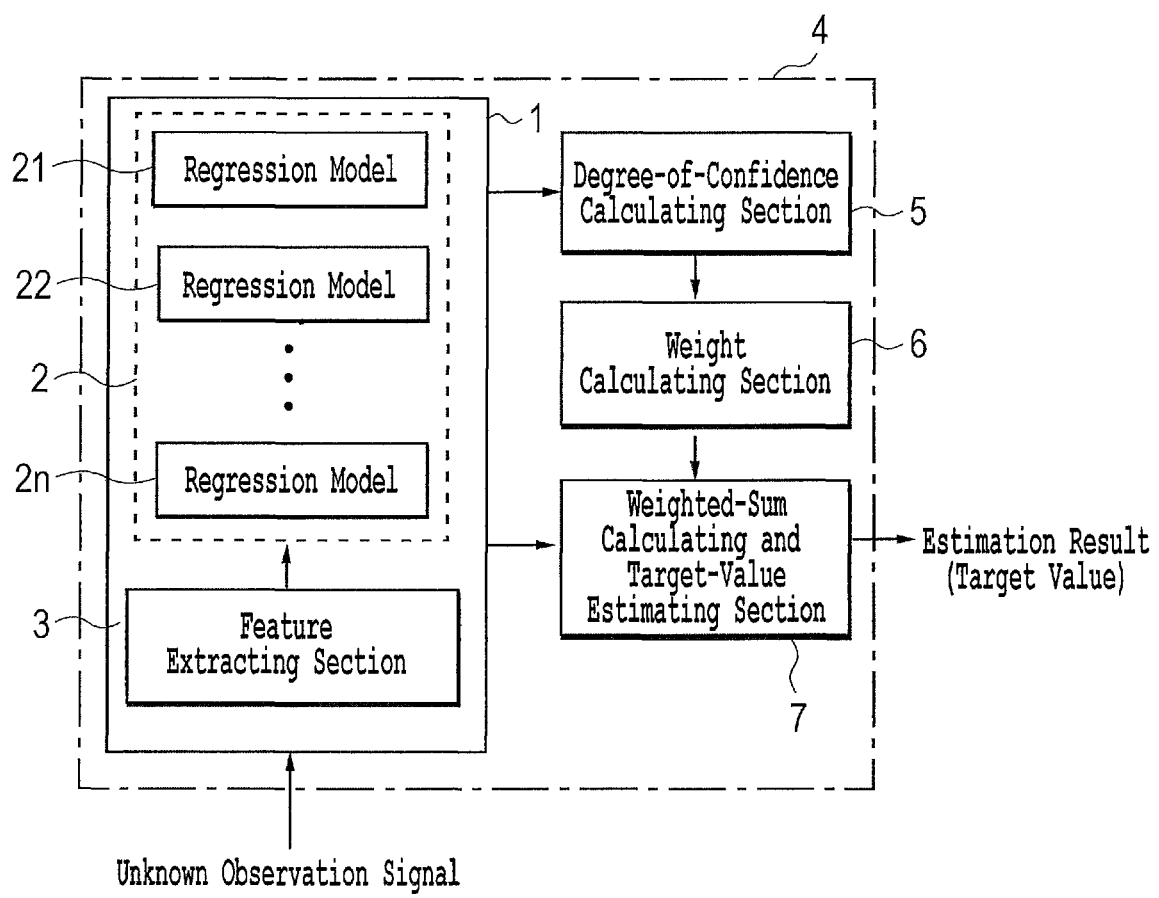
FIG. 1 is a block diagram illustrating a fundamental configuration of a first embodiment of a system for estimation for a target value according to the present invention.

Now, with reference to the accompanying drawings, embodiments of a system, a method, and a computer program for estimation of a target value according to the present invention will be described below in detail. FIG. 1 is a block diagram illustrating a fundamental configuration of an embodiment of a system for estimation for a target value according to the present invention, whereby a computer or a plurality of processors and memories are used to implement the embodiments. A system for estimation of a target value of the present invention comprises an estimator configuring section 1 and an estimating section 4. The estimator configuring section 1 includes a regression model creating and storing section 2 operable to create and store a plurality of regression models (regressors) 21 to 2n (where n is a positive integer of two or more), and a feature extracting section 3. The regression models 21 to 2n are each capable of obtaining a probability distribution of the estimation results and a degree of confidence. For example, those regression models may employ Gaussian process, Kriging method, and Bayes estimation. The regression models 21 to 2n correspond to the plurality of features and are optimized (specifically, parameters are optimized), based on the training data comprised of a pair of the extracted features and target values (signal target values) to be estimated for the observation signals. Especially, when Gaussian process is employed in the regression models 21 to 2n, mathematical formulation is facilitated. The distribution of estimation results can be represented as a Gaussian distribution and an inverse number of a variance in probability distributions can be interpreted as the degree of confidence for the estimation results. Therefore, the Gaussian process regression model is suitable for the present invention that uses weighting based on the degree of confidence.

Preferably, the kind of an observation signal to be used in training is the same as or similar to that of an unknown observation signal. For example, if an unknown observation signal is a music audio signal, an observation signal for training is preferably a music audio signal. If an observation signal is a music audio signal and the present invention is used in music emotion recognition, a target value is a music emotion value.

The estimating section 4 includes a degree-of-confidence calculating section 5, a weight calculating section 6, and a weighted-sum calculating and target-value estimating section 7 in addition to the estimator configuring section 1. The estimating section 4 receives an observation signal to be analyzed as an input, and obtains a mean of the estimation results (target values) and a variance in probability distributions using the regression models 21 to 2n. Then, weights to be added to the estimation values are calculated based on the degrees of confidence (the degree of confidence is an inverse number of the variance) that are obtained by the regression models 21 to 2n. Aggregation of weighted estimation results is performed by summing up the weighted estimated results or calculating a weighted sum. Specifically, the estimating section 4 inputs an unknown observation signal to the estimator configuring section 1, and estimates, using the regression models 21 to 2n, a plurality of target values (feature target values) for the corresponding features of the unknown observation signal, as extracted by the feature extracting section 3. The estimation results of the target values (feature target values) are aggregated to estimate a target value (signal target value) for the unknown observation signal.

The estimation results are calculated for the individual regression models 21 to 2n from a mean value of probability distributions as obtained by inputting the unknown observation signal to the regression models 21 to 2*n*. The degree-of-confidence calculating section 5 calculates respective degrees of confidence for the outputs from the regression models 21 to 2*n*, based on respective variances of probability distributions as obtained from the regression models 21 to 2*n* with the respective degrees of confidence for the inputs to the regression models 21 to 2*n*. The degree of confidence is higher in a region with a smaller variance in estimation results of the features as obtained using the regression models 21 to 2*n*, and the degree of confidence is lower in a region with a larger variance in estimation results. The weight calculating section 6 calculates a weight based on the calculated degree of confidence. In the weight calculating section 6, for example, if an extremely low degree of confidence is not obtained, a plurality of degrees of confidence obtained from the individual regression models 21 to 2*n* are used as pre-normalized weights in a linear relation, whereby the obtained degrees of confidence are intactly used, and all of the pre-normalized weights are summed up to one (1). The normalized result thus calculated is used as a weight. If an extremely low degree of confidence is obtained, for the purpose of performing robust aggregation, pre-normalized weights are calculated in a non-linear relation, whereby the higher a plurality of degrees of confidence obtained from the regression models 21 to 2*n* are, the larger pre-normalized weights are emphasized to be, and the lower the obtained degrees of confidence are, the smaller pre-normalized weights are emphasized to be. All of the pre-normalized weights are summed up to one (1). The normalization result thus obtained is used as a weight. The way of calculating a weight will be described in detail later using a specific example.

The weighted-sum calculating and target-value estimating section 7 calculates a weighted sum of the estimation results output from the individual regression models 21 to 2*n*, namely, aggregates the estimation results. The weighted-sum calculating and target-estimating section 7 estimates a target value (signal target value) for the unknown observation signal through the aggregation of the estimation results obtained from the regression models 21 to 2*n*.

The degree-of-confidence calculating section 5 calculates a degree of confidence for an output from each of the regression models, based on a variance of probability distributions obtained by each regression model each time an output is issued from each regression model according to an input observation signal. The weight calculating section 6 adds an appropriate weight to the estimation result obtained from each of the regression models. The weighted-sum calculating and target-value estimating section 7 aggregates a plurality of estimation results by summing up the estimation results as a weighted sum. Thus, an appropriate estimation result can be obtained. The aggregation of the estimated results will be described in detail later using a specific example.

The feature groups will be described later in detail. Briefly describing here, the features to be analyzed may be categorized into feature groups. Preferably, the groups are each comprised of inter-related features. When a plurality of features are categorized into a plurality of feature groups, a plurality of regression models 21 to 2*n* are prepared for the plurality of feature groups. In this configuration, the regression model can be trained for a particular feature group or the regression model can be trained so as to be specialized for a feature group. In respect of some input observation signals, higher estimation performance can be attained. If an observation signal is a music audio signal and a target value is a music emotion value, analysis accuracy may be increased by including at least a temporal feature group, a spectral feature group, a pitch-related feature group, and amplitude spectral feature group in the feature groups.

The estimating section 4 may have a function of interpolation of the estimation results according to a proximity of an input value to known input values prepared for the feature groups in the regression models when the input value is different from the known input values. In the embodiment of the present invention, this function is given to each of the regression models 21 to 2*n*.

The estimator configuring section 1 and the estimating section 4 are each implemented by using a plurality of processors and a plurality of memories. The feature extracting section 3, the regression model creating and storing section 2, the degree-of-confidence calculating section 5, the weight calculating section 6, and the weighted-sum calculating and target-value estimating section 7 may each be implemented by using at least one processor and at least one memory.

Figure 2:
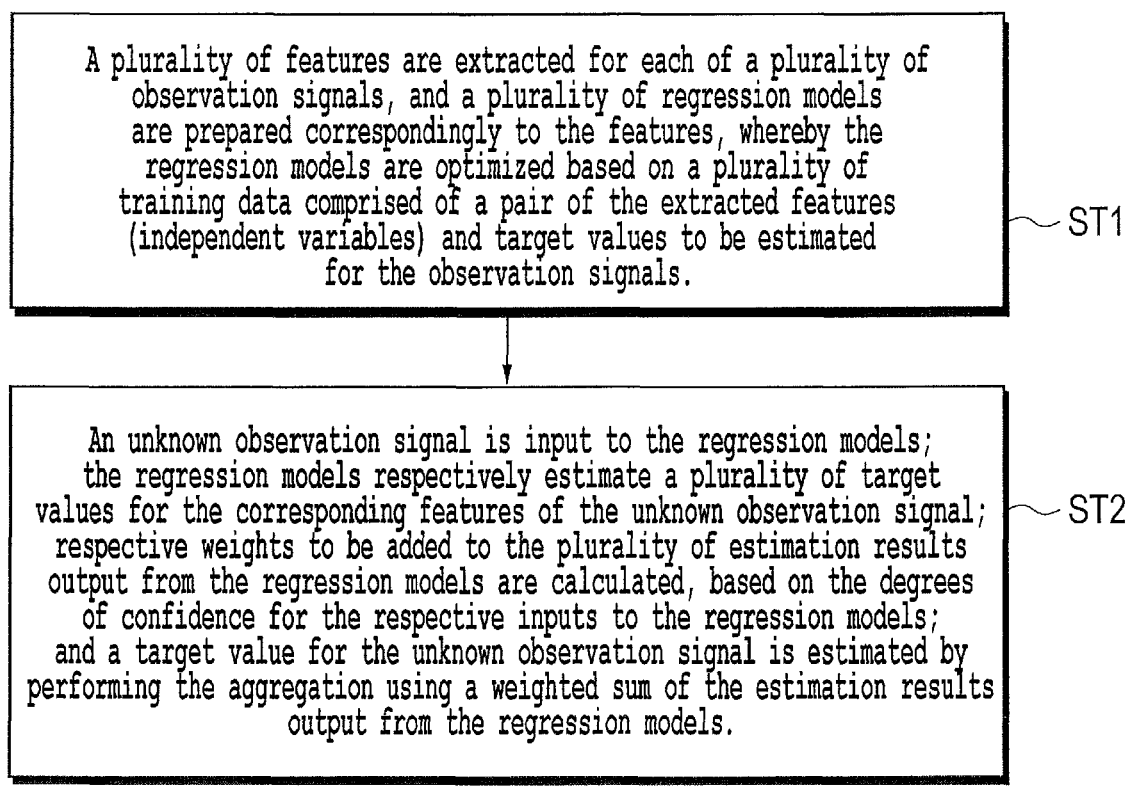
FIG. 2 illustrates a method or a program algorithm for implementing the first embodiment of FIG. 1 using a computer.

FIG. 2 illustrates a method or a program algorithm for implementing the first embodiment of FIG. 1 using a computer. The program is recorded in a computer-readable, non-transitory recording medium. The algorithm is constituted from two steps, a preparing step ST1 and an estimating step ST2. In the preparing step ST1, the feature extracting section 3 extracts a plurality of features from each of a plurality of observation signals. A plurality of regression models 21 to 2*n* are prepared correspondingly to the plurality of features. Here, the regression models 21 to 2*n* are optimized, based on a plurality of training data comprised of a pair of the extracted features and target values to be estimated for the plurality of observation signals. In the estimating step ST2, an unknown observation signal is input to the regression models; the regression models 21 to 2*n* respectively estimate a plurality of target values for the corresponding features of the unknown observation signal; and a target value for the input observation signal is estimated through the aggregation of estimation results of the target values for the corresponding features. In the estimating step ST2, respective weights to be added to the plurality of estimation results output from the individual regression models are calculated, based on the respective degrees of confidence for the inputs to the regression models 21 to 2*n*; and a target value for the unknown observation signal is estimated by performing the aggregation using a weighted sum of the estimation results output from the individual regression models 21 to 2*n*.

[Embodiment in which a Music Audio Signal is an Observation Signal]

Figure 3:
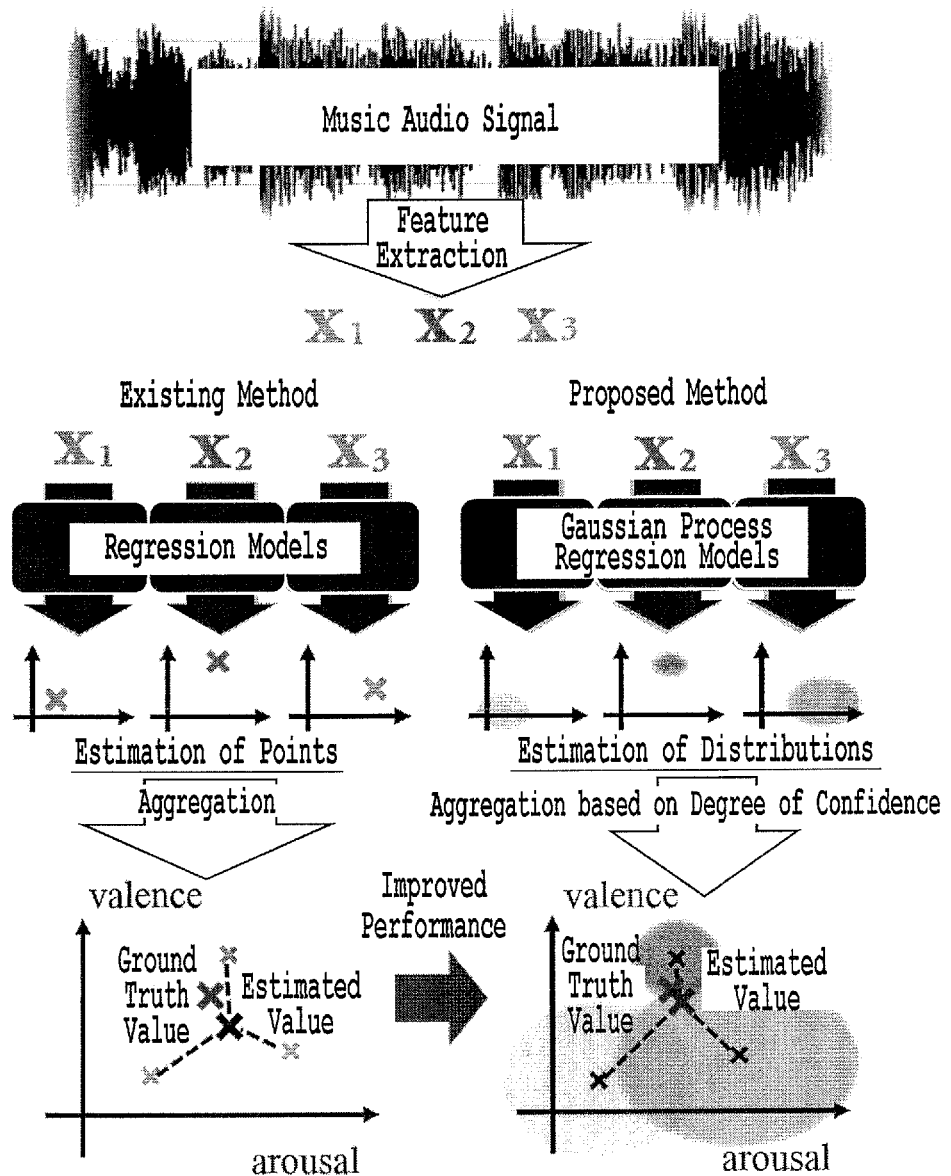
FIG. 3 schematically illustrates a conventional method and the method of an embodiment of the present invention.

Now, with reference to FIG. 1, the embodiment of FIG. 1 will be described. In this embodiment, respective degrees of confidence are calculated for the estimation results output from the regression models in respect of an input music audio signal; maximum likelihood estimation is performed using the calculated degrees of confidence; and the estimation results are aggregated. In this embodiment, the regression models (the regression models 21 to 2*n* of FIG. 1) employ the Gaussian process for regression. A music emotion value, as a target value, is a two-dimensional value comprised of Valence and Arousal (VA) values. FIG. 3 schematically illustrates a conventional method and the method of an embodiment of the present invention (a method proposed by the inventors). In this embodiment, a plurality of features $X_1$, $X_2$, and $X_3$, which are described later, are extracted from the music audio signal; the respective degrees of confidence are calculated for the inputs to the Gaussian process regression models (regression models 21 to 2n of FIG. 1) corresponding to the extracted features $X_1$, $X_2$, and $X_3$; the respective weights to be added to the estimation results output from the regression models (regression models 21 to 2n of FIG. 1) are calculated based on the calculated degrees of confidence for the inputs to the Gaussian process regression models; and a target value of the unknown observation signal is estimated through the aggregation using a weighted sum of the estimation results. In contrast, the regression model of the conventional method performs point estimation and aggregates the estimation results. As with this embodiment of the present invention, an estimated value will be closer or more proximate to a ground truth value by aggregating the estimation results using the weighted sum based on the degrees of confidence that vary according to the inputs.

[Acoustic Features]

The acoustic features can be selected depending upon what contents of the music the acoustic features correspond to when estimating a VA value. The mode and harmony are related to the Valence values, and the tempo, pitch, loudness, and timbre are related to the Arousal values. In the training phase and the analysis phase, the acoustic features typically include zero-cross rate, RMS (root-mean-squared amplitude), spectral features (spectral contrast, spectral centroid, spectral flux, spectral rolloff, and spectral flatness), pitch, mel-frequency cepstral coefficient (MFCC), and chroma vector (or pitch class profile). In this embodiment, a 6373-dimensional feature vector is categorized into a plurality of feature groups according to the nature of the features. For example, the features groups are a temporal feature group, a spectral feature group, a pitch-related feature group, and an amplitude spectral feature group.

[Training Phase]

In this embodiment, Gaussian process regression models are trained. The training data used in training the Gaussian regression models is "Emotion in Music Database" [M. Soleymani, M. N. Caro, and E. M. Schmidt, "1000 songs for emotional analysis of music," in Proceedings of CroudMM 2013. ACM, 2013]. The training data include music audio signals of 744 pieces of music (audio clips). The audio signals are annotated with VA values (music emotion values) on a scale of one (1) to nine (9). The VA values used in the Gaussian process regression were in advance normalized within a scale of −1.0 to 1.0. FIG. 4 illustrates example training data. In the example of FIG. 4, the 30-second music signal segments $S_1$ to $S_N$ of a known observation signal are annotated with the Valence and Arousal values.

Figure 5:
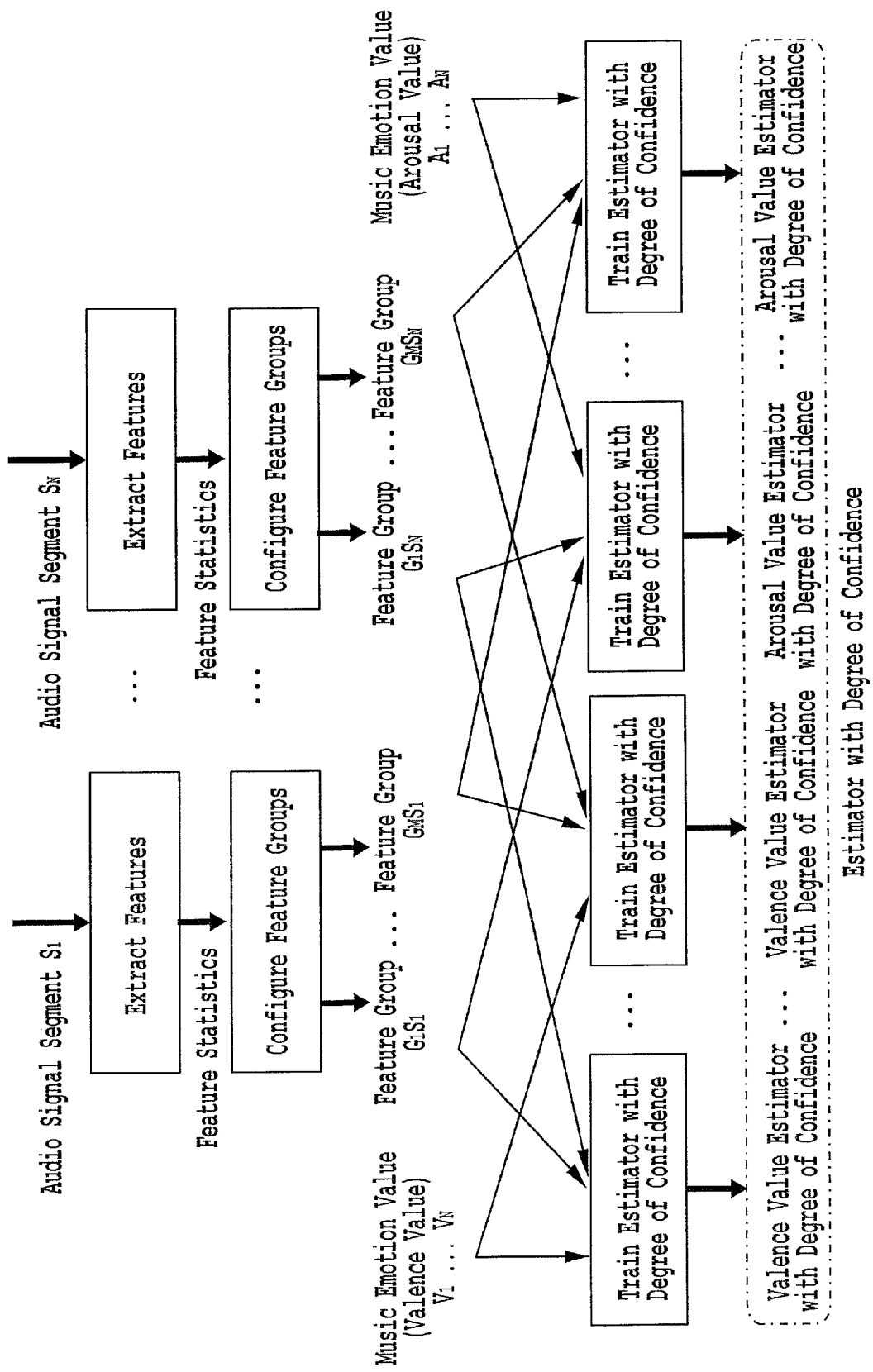
FIG. 5 illustrates the training step for regression models employing the Gaussian process.

In accordance with the steps illustrated in FIG. 5, a plurality of music features were categorized into a plurality of music feature groups $G_1S_1$ to $G_MS_N$ and the Gaussian process regression models 21 to 2n were trained. Specifically, the music audio signals $S_1$ to $S_N$ (619 pieces of music) randomly selected from the above-mentioned training data of music audio signals (744 pieces of music) were used in training and the music signals used were annotated with music emotion values ($V_1$ to $V_N$ and $A_1$ to $A_N$). Then, the parameters of the Gaussian process regression models 21 to 2n were optimized by the method of "Constrained Optimization By Linear Approximation (COBYLA) method [A. R. Conn, K. Scheinberg, and P. L. Toint, "On the convergence of derivative-free methods for unconstrained optimization," Approximation theory and optimization, pp. 83-108, 1997]. In the regression models 21 to 2n of which the parameters were thus optimized, estimators for the Valence values with n degrees of confidence and estimators for the Arousal values with n degrees of confidence were configured, as illustrated in FIG. 5.

Figure 6:
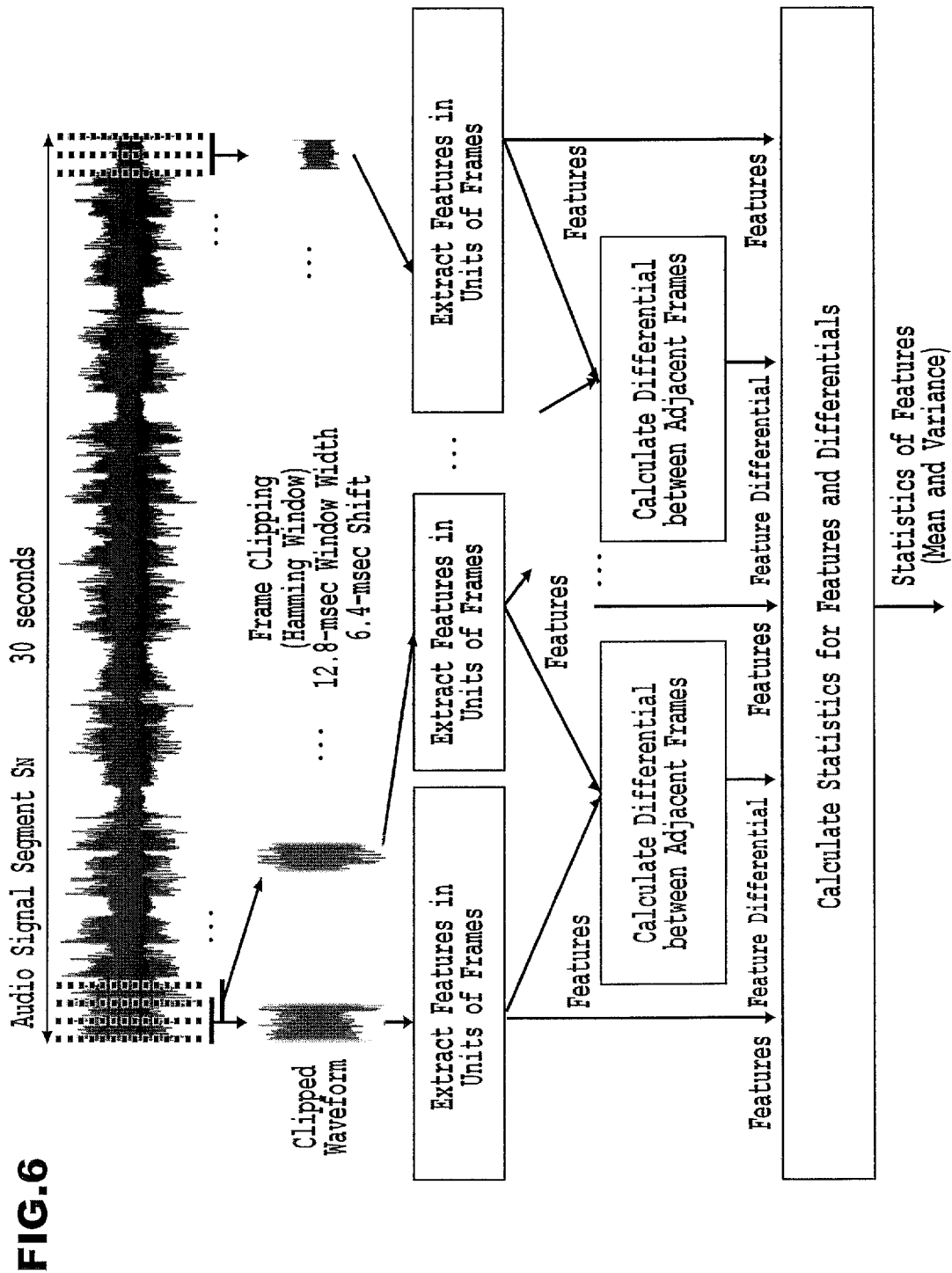
FIG. 6 illustrates a flow of the calculating step of the features statistics (mean values and variances).
Figure 7:
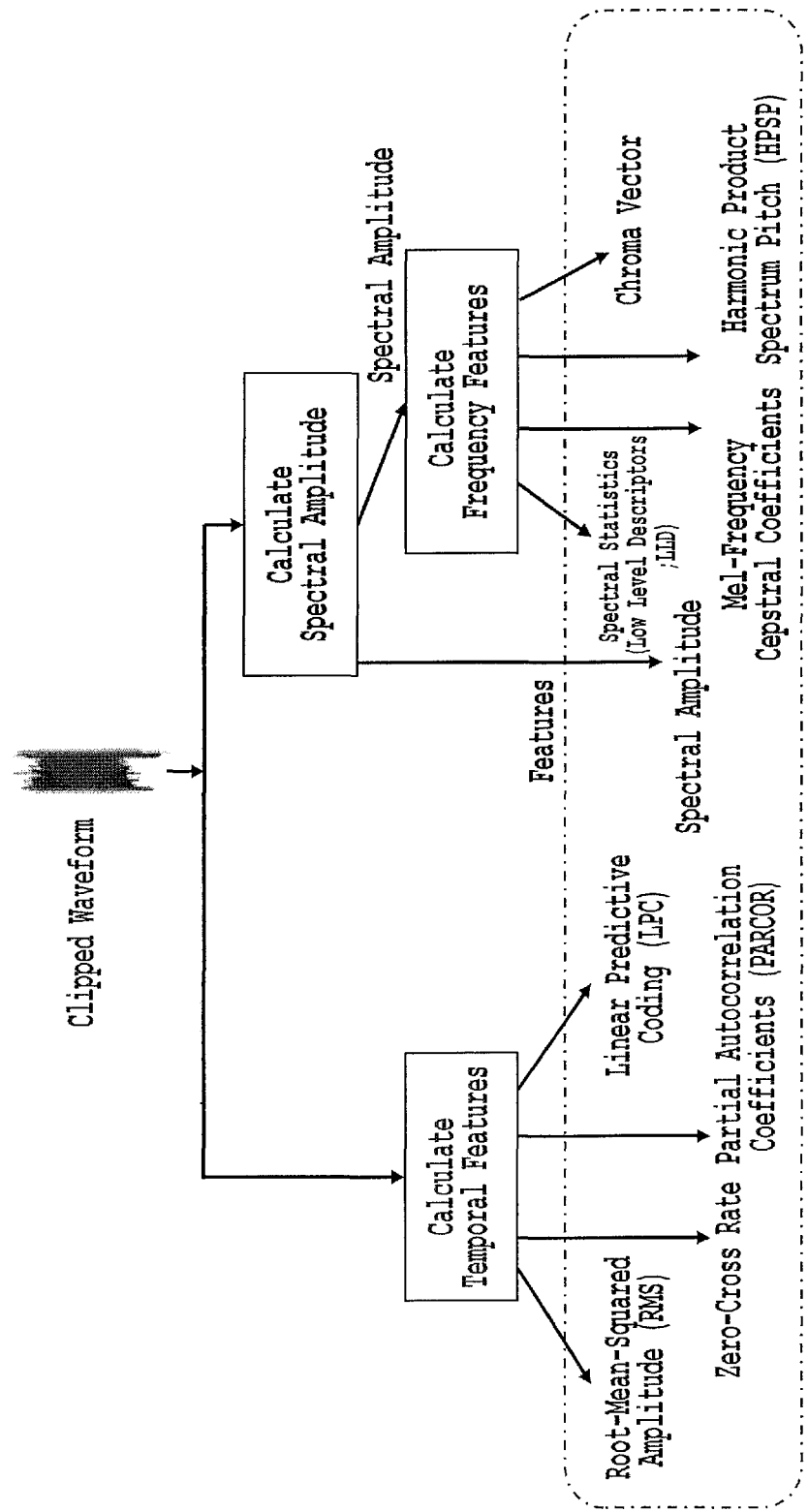
FIG. 7 illustrates a flow of the feature extracting step in units of frames.

Feature statistics (mean and variance) for creating the feature groups in the training phase are calculated in accordance with the steps of FIG. 6. As illustrated in FIG. 6, a plurality of frames are clipped out of the music audio signal using a Hamming window with a width of 12.9 mm at shifting of 6.4 msec. The step of "Extract Feature in units of Frames" in FIG. 6 is performed in accordance with the flow illustrated in FIG. 7. A differential of features obtained from adjacent frames is calculated, and the respective statistics of the features and the feature differentials are calculated.

Figure 8:
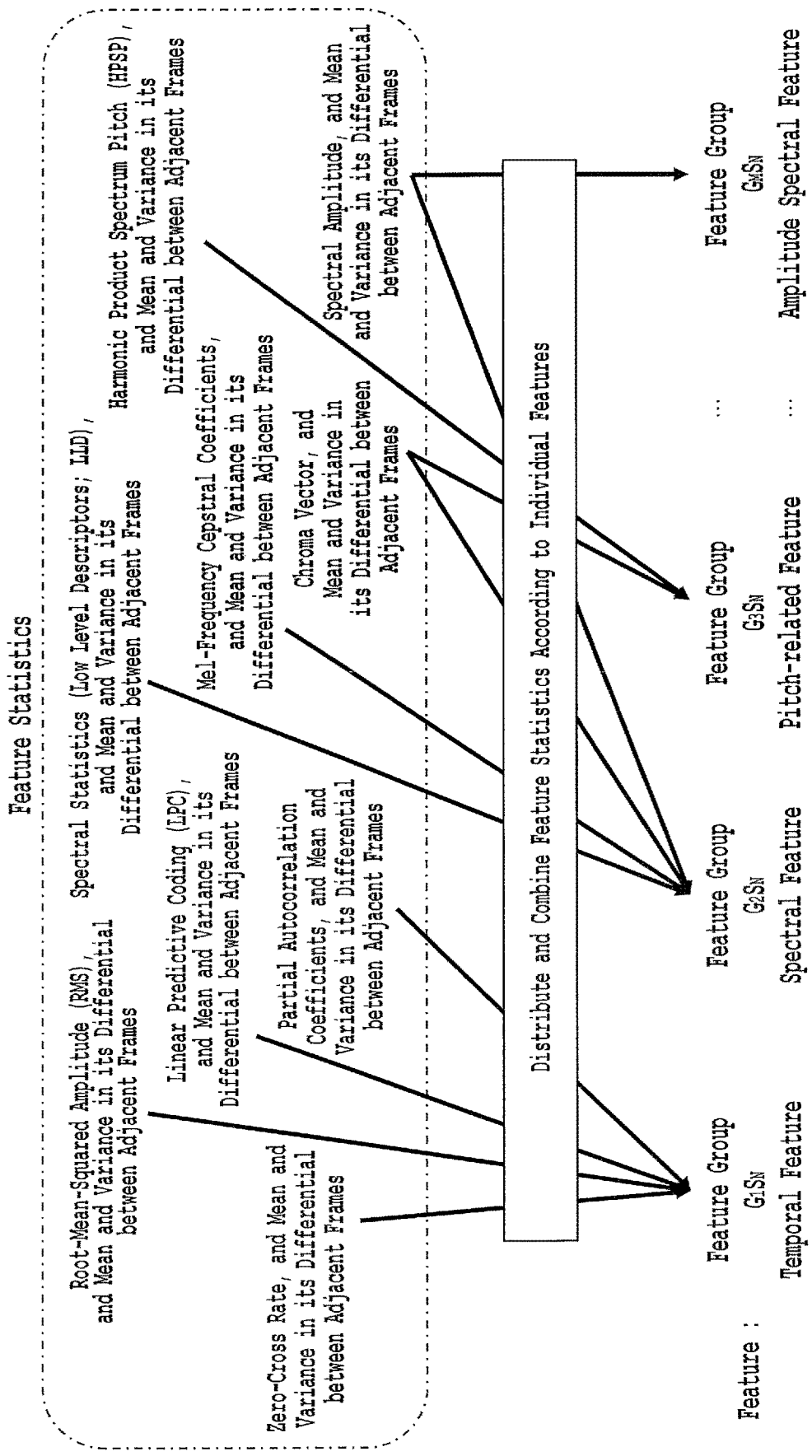
FIG. 8 illustrates a flow of the step of configuring the feature groups.
Figure 9:
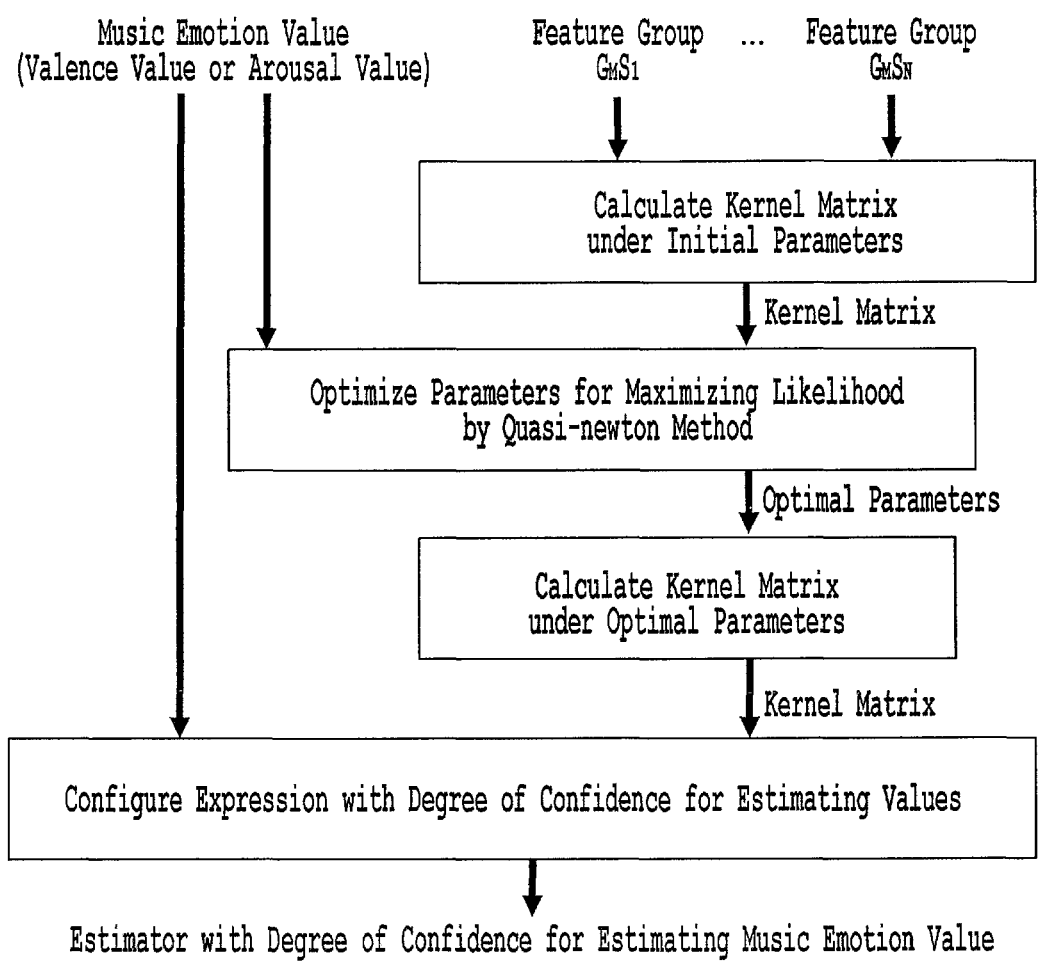
FIG. 9 illustrates a flow of the step of training estimators each provided with the degree of confidence.

The step of "Configure Feature Groups" in FIG. 5 is performed based on the statistics of features and feature differentials in accordance with the flow illustrated in FIG. 8. The step of "Train Estimators with Degree of Confidence" is performed in accordance with the flow of FIG. 9. In the flow of FIG. 9, the feature groups $G_MS_1$ to $G_MS_N$ which have been categorized in accordance with the flow of FIG. 8, and the music emotion values $V_1$ to $V_N$ and $A_1$ to $A_N$ are used as inputs and arithmetic expressions [expressions (1) and (2) as described later] are constructed for calculating estimation results with degree of confidence. Specifically, under the initial parameters, a kernel matrix ["K" in the expressions (1) and (2) as described later] is calculated from the feature groups $G_MS_1$ to $G_MS_N$. The maximum likelihood parameters or parameters for maximizing the likelihood [parameters ($\sigma_1$, s, $\sigma_{obs}$) in the expression (6) as described later] are calculated by optimization (quasi-Newton method) using the music emotion values $V_1$ to $V_N$ and $A_1$ to $A_N$ obtained from the training database. Then, under the optimized parameters, an optimized kernel matrix is calculated. Finally, the expressions for calculating estimation results with degree of confidence [expressions (1) and (2), and $y_n$ and $\sigma^2$] are obtained from the kernel matrix and the music emotion values $V_1$ to $V_N$ and $A_1$ to $A_N$. Thus, the estimators for music emotion values with degree of confidence are implemented in the regression models 21 to 2n.

Figures 10A, 10B:
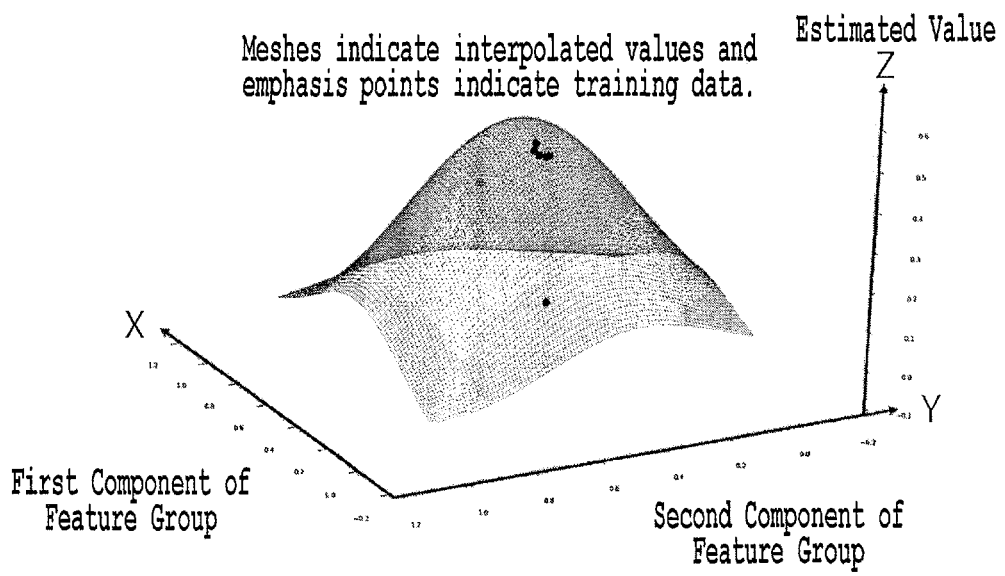
FIGS. 10A and 10B are used to explain creation of arithmetic expressions for interpolation of music emotion values.

FIG. 10A illustrates an algorithm for providing a function of interpolation to an arithmetic expression [$y_n$ in expression (1) as described later] for an estimated value, which is a music emotion value, in the expression for calculating estimation results with degree of confidence as implemented in the regression models 21 to 2n. The expression [$y_n$ in expression (1) as described later] for an estimated value thus created by the following algorithm is defined so as to interpolate the music emotion values with respect to input values from the unknown observation signal, according to the proximity to the values of the feature groups that have been calculated from the database used in training, based on the music emotion values (Valence and Arousal values) obtained from the training database and the kernel matrix. FIG. 10B illustrates an image of the interpolation. In FIG. 10B, for better understanding, the X and Y axes respectively represent the first component (one feature) and the second component (another feature) included in one feature group, and the Z axis represents an estimated value. The black dots in FIG. 10B are the values of training data. The mesh positions of the net are interpolated values as calculated by the expression. It is found that values corresponding to unknown inputs can be obtained even with a few number of training data, provided that the expression has a function of interpolation. Actually, calculation is done between a plurality of components included in a plurality of features. This calculation cannot be represented as an image like the image of FIG. 10B.

Figure 11A:
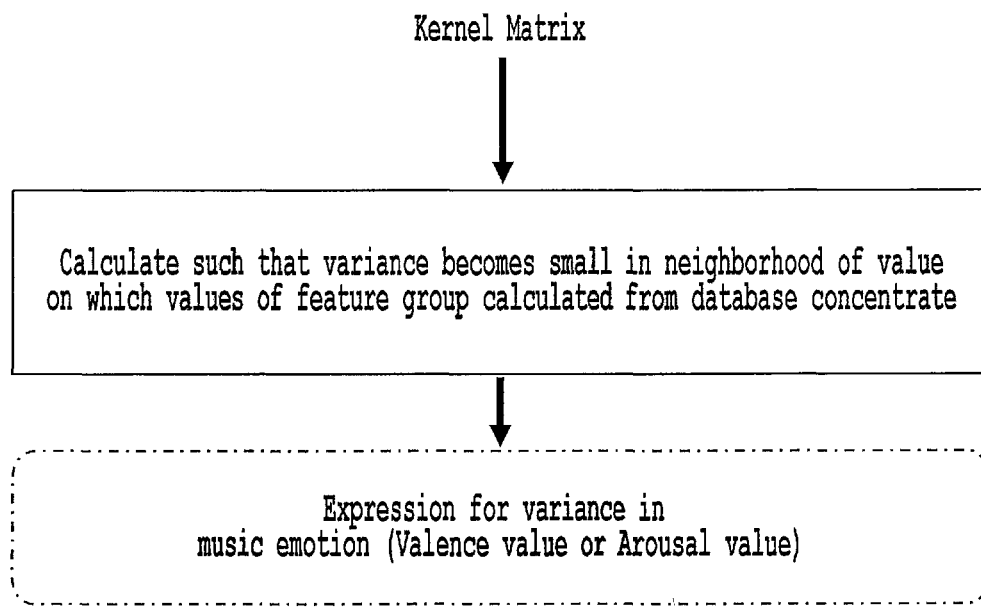
FIGS. 11A and 11B are used to explain creation of arithmetic expressions for interpolation of degrees of confidence for music emotion values.
Figure 11B:
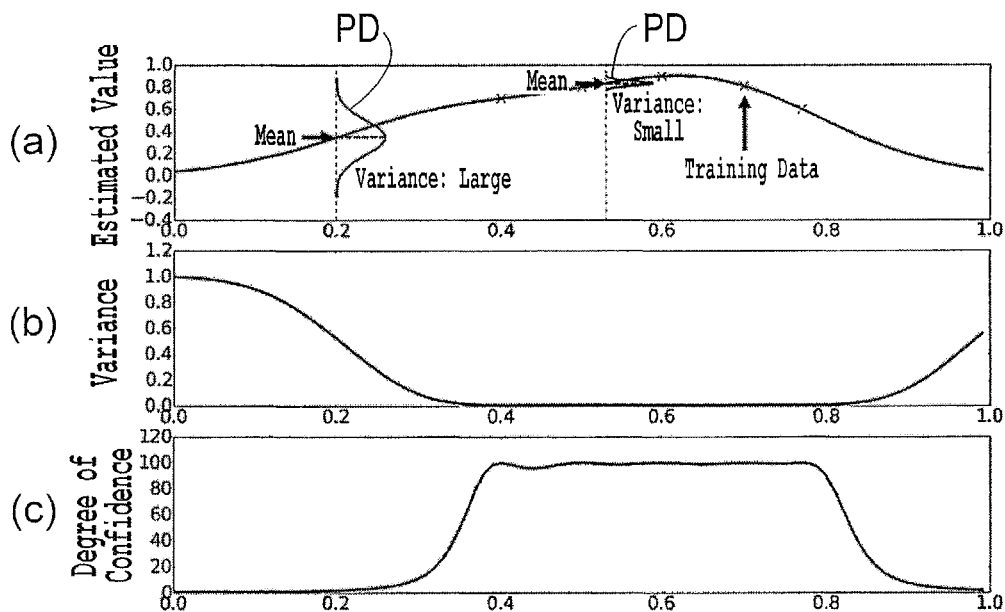

FIG. 11A illustrates an algorithm for obtaining an arithmetic expression [$\sigma^2$ in expression (2) as described later] having a function of interpolation for calculating a variance used to calculate a degree of confidence in the estimators with degree of confidence for music emotion values as implemented in the regression models 21 to 2n. The expression for calculating a variance that has a function of interpolation is defined such that the variance becomes small in the neighborhood of a value around which the values of the feature groups calculated from the training database concentrate with respect of the kernel matrix ["K" in the expression (2) as described later] obtained from the training database. In FIG. 11B (a), (b), and (c) schematically illustrate the relationship among the interpolated training data, the variance, and the degree of confidence. In FIG. 11B (a), (b), and (c), the lateral axes indicate the normalized values of the features in a particular feature group. In FIG. 11B (a), the interpolated values (marked with an "x") for the training data in a particular feature group are connected. In FIG. 11B (a), curved lines annotated with PD are probability distributions of the estimation results. The probability distributions exist such that an estimation result (a mean value) exists correspondingly to the peak of the probability distribution PD. The spreading of the probability distribution is proportional to the magnitude of a variance. In a region with a small variance, the training data concentrate. In a region with a large variance, the training data do not concentrate. In FIG. 11B (c), the degree of confidence is an inverse number ($1/\sigma^2$) of the variance. It can be known from the relationship of estimated values and the degrees of confidence that in a region where the training data concentrate, the degree of confidence is high. In the present invention, an appropriate weight is added to an estimation result (a mean value), based on the degree of confidence, and a plurality of estimation results are aggregated as a weighted sum. As a result, an appropriate target value can be obtained.

[Optimization of Parameters for Maximizing Likelihood]

When using Gaussian process regression models, the parameters can be optimized as described below. Assume training data have D-point data and the training data for the n-th feature are $\{x_n^{(1)} \ldots x_n^{(D)}, y_n^{(1)} \ldots y_n^{(D)}\}$; and $y_n$ is a vector $y_n = (y_n^{(1)} \ldots y_n^{(D)})$ that gathers training data values. T represents a transpose of a vector. With the Gaussian process regression, the distribution of target values to be estimated based on the training data can be obtained as a Gaussian distribution $P_n(y) = N(y_n, \sigma^2_n)$. A mean $y_n$ and a variance $\sigma^2_n$ of the Gaussian distributions (probability distributions) are obtained as follows:

$$y_n = k_*^T(K + \sigma_{obs}^2)^{-1} y_n, \quad (1)$$

$$\sigma_n^2 = k(x_n, x_n) + \sigma_{obs}^2 - k_*^T(K + \sigma_{obs}^2 I)^{-1} K_*. \quad \text{[Expressions (1) and (2)]}$$

In the above expressions, K is a calculated kernel matrix under the optimized parameters. "I" is a matrix having a diagonal component of one (1) and the other non-diagonal components of zero (0). $\sigma_1$, s, and $\sigma_{obs}$ are parameters. k(•,•) is a function for defining the relative relationship of the feature vectors, and is represented as follows.

[Expression (3)]

$$k(x_n^{(i)}, x_n^{(j)}) = \sigma_f^2 \exp\left(-\frac{1}{2s^2}|x_n^{(i)} - x_n^{(j)}|\right), \quad (3)$$

k* and K in the above expression are represented as follows.

[Expressions (4) and (5)]

$$k_* = (k(x_n, x_n^{(1)}) \ldots k(x_n, x_n^{(D)})) \quad (4)$$

$$K = K_{ij} = k(x_n^{(i)}, x_n^{(j)}) \quad (5)$$

The parameters $\sigma_{obs}$, $\sigma_f$, ands can be obtained through optimization to maximize the logarithm likelihood represented as follows:

[Expression (6)]

$$LL(\sigma_f, s, \sigma_{obs}) = -\frac{1}{2}\log|K + \sigma_{obs}^2 I| - \frac{1}{2}y_n^T(K + \sigma_{obs}^2 I)^{-1} y_n - \frac{D}{2}\log 2\pi \quad (6)$$

The optimization may be done by the quasi-Newton method or the method of Constrained Optimization By Linear Approximation (COBYLA) method [A. R. Conn, K. Scheinberg, and P. L. Toint, "On the convergence of derivative-free methods for unconstrained optimization," Approximation theory and optimization, pp. 83-108, 1997]. In this embodiment, the Gaussian process regression models are used, assuming that errors in estimated VA values follow the Gaussian distribution. However, any other regression model, which can obtain a mean and a variance of target values to be estimated, can be used. For example, Kriging method regression models or Bayes estimation regression models may be used.

As described above, the optimized regression models 21 to 2n are used to perform the analysis phase.

[Analysis Phase]

In the analysis phase, a music audio signal to be analyzed is input and a mean and a variance of VA values are obtained respectively using the regression models. Based on the degrees of confidence (an inverse number of the variance) obtained by the regression models, a weighted sum of estimation results is calculated. A variance of the probability distributions as calculated by the regression models is determined by inter-relationship of the individual acoustic features in the training data. For example, when there is a large variance in values given to the acoustic feature of which the VA value is annotated with a ground truth label in the training data, if a VA value is estimated by the regression models using that acoustic feature, a variance in estimated values is large. From this, it can be known that the degree of confidence for the estimated result is low with respect to the input music audio signal. Since the degree of confidence can be calculated according to the input music audio signal, the estimation results from the individual regression models are adaptively aggregated.

Figure 12:
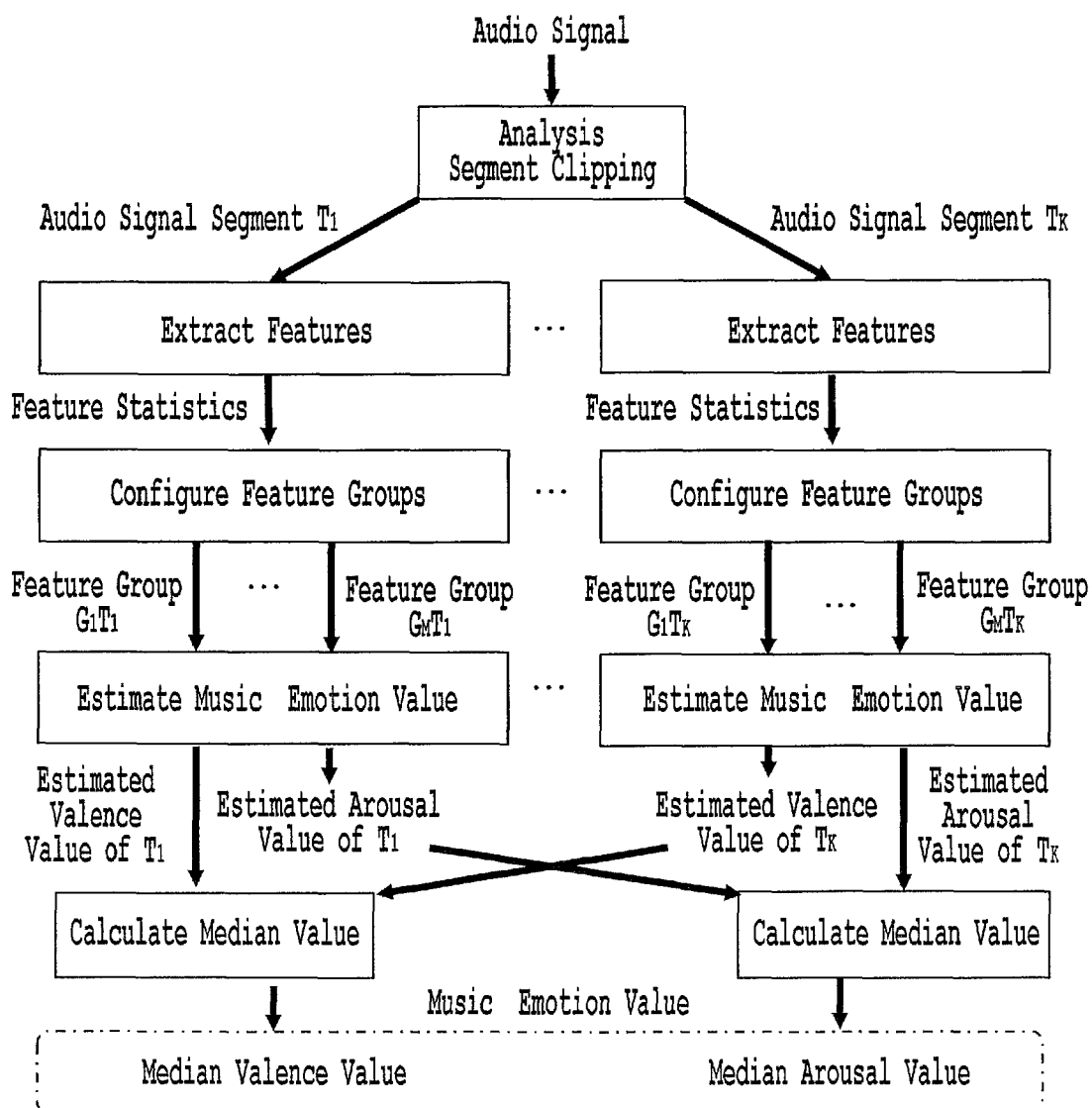
FIG. 12 illustrates a method or program algorithm for implementing estimation based on the degree of confidence using a computer.
Figure 13:
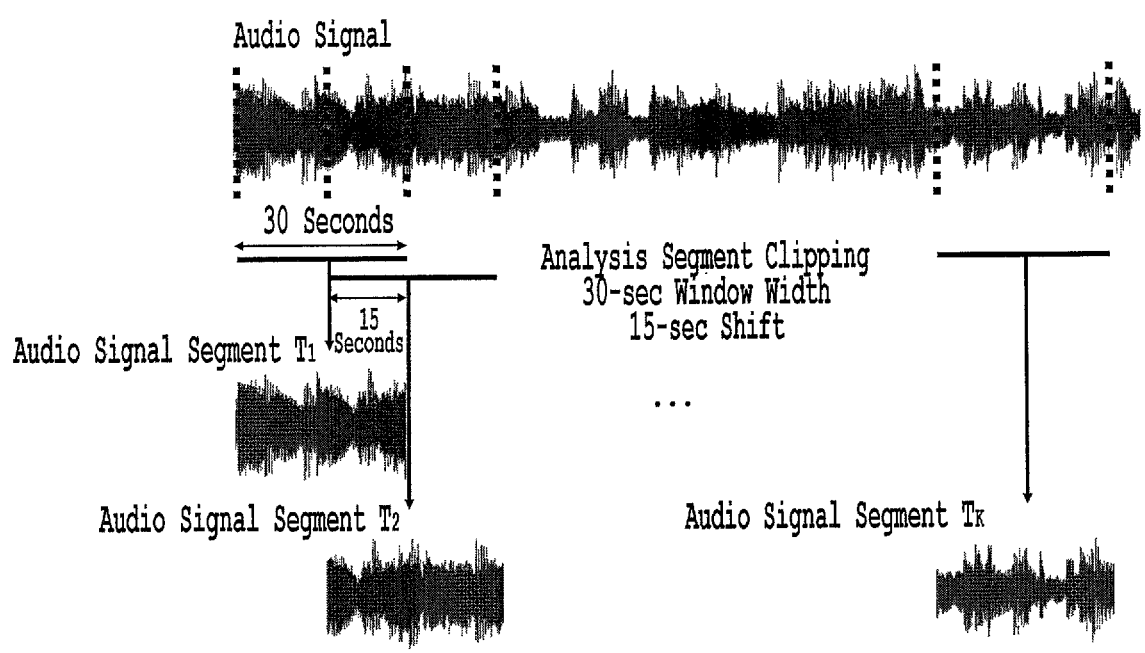
FIG. 13 is used to explain clipping segments out of an observation signal.
Figure 14:
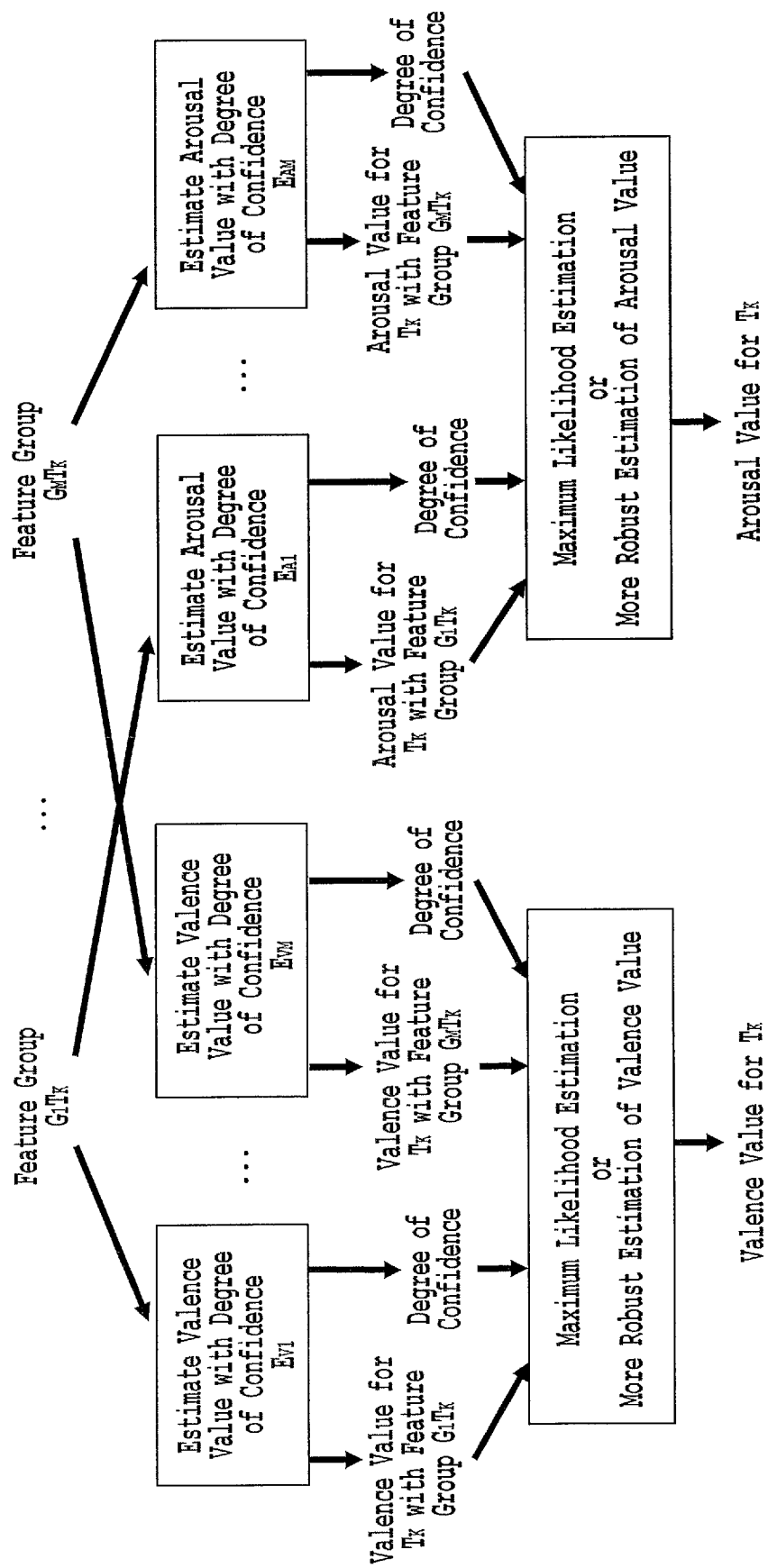
FIG. 14 illustrates detailed steps of estimating music emotion.

In the analysis phase, a VA value is estimated from an unknown music audio signal (an observation signal), based on the degree of confidence. FIG. 12 illustrates a method or program algorithm for implementing estimation based on the degree of confidence using a computer. In performing the analysis, segments are clipped out of the unknown music audio signal (observation signal) using a window having a width of 30 seconds as illustrated in FIG. 13. Specifically, a plurality of segments $T_1$ to $T_K$ of the music audio signal are clipped out by moving the window along the temporal axis at an interval of 15 seconds. Next, as illustrated in FIG. 12, features are extracted from each of the segments $T_1$ to $T_K$ and the statistics of the features are calculated. Then, a plurality of feature groups $G_1 T_1$ to $G_M T_1, \ldots G_1 T_K$ to $G_M T_K$ are configured for the respective segments $T_1$ to $T_K$ of the music audio signal. The step of "Configure Feature Groups" is performed in the same manner as the step of configuring feature groups in the training phase as described in connection with FIG. 8. Next, in the step of "Estimate Music Emotion", Valence and Arousal values for the music audio signal segments $T_1$ to $T_K$ are estimated from the respective feature groups $G_1T_1$ to $G_MT_1$, ... $G_1T_K$ to $G_MT_K$ of the music audio signal segments $T_1$ to $T_K$. FIG. 14 illustrates detailed steps of "Estimate Music Emotion". In the actual step of "Estimate Music Emotion", the degrees of confidence are calculated from the values for the feature groups $G_1T_1$ to $G_MT_1$, ... $G_1T_K$ to $G_MT_K$ in addition to the estimated Valence and Arousal values calculated from the feature groups $G_1T_1$ to $G_MT_1$, ... $G_1T_K$ to $G_MT_K$.

Then, maximum likelihood or robust estimation is performed using the estimated Valence and Arousal values and the degrees of confidence. Specifically, the degrees of confidence are calculated for respective outputs from the regression models according to the music audio signal segment $T_1$ to $T_K$, based on the variances of probability distributions obtained by the regression models. Appropriate weights based on the respective degrees of confidence are added to the respective estimation results (estimated Valence and Arousal values) from the regression models. Then, the estimation results are aggregated as a weighted sum. The embodiment of a system for estimation of a target value according to the present invention has been described so far. A median value calculated in FIG. 12 is a median value of target values obtained from the individual music audio signal segments. A music emotion value for the whole music audio signal can be known from the median value.

[Aggregation of Estimation Results Based on the Degrees of Confidence]

Given a music audio signal of a particular length, music emotion elicited or evoked by the music audio signal is estimated as a VA value. In this embodiment, the regression models are constructed respectively from N kinds of feature vectors $x_1$ ... $x_N$ and the estimation results from the regression models are aggregated based on the degrees of confidence for the estimation results. Thus, the music emotion is analyzed. The same idea can be applied to both of Valence and Arousal values. Here, estimation of one of the two values will be described. A valence or arousal value to be estimated is denoted by y, and an estimation result obtained using the n-th feature vector is denoted by $y_n$. An appropriate weight $W_n$ to be added to $y_n$ (n=1 ... N) is calculated as follows.

[Quantification of Degrees of Confidence for Estimation Results and Aggregation based on Degrees of Confidence]

Here, the transform from the n-th feature vector $x_n$ to an emotion value $y_n$ is discussed. If it is known that a true value of an emotion elicited by a given audio signal is y*, an estimation error $\varepsilon_n$ of the feature can be defined as follows.

[Expression (7)]

$$\varepsilon_n(y^*) = y^* - y_n \quad (7)$$

Assume that two kinds of emotion values have been estimated, namely, estimated valued $y_n$ and $y_m$ have been obtained respectively from the n-th and m-th feature vectors. If $\varepsilon_n(y^*)$ and $\varepsilon_m(y^*)$ are compared and $\varepsilon_n(y^*)$ is closer to zero (0), it can be known that the n-th feature has a higher degree of confidence than the m-th feature in estimating the true value y*. If the true value y* cannot be known, the degree of confidence needs to be probabilistically estimated. Assuming that $\varepsilon_n(y^*)$ follows the Gaussian distribution with zero mean and variance $\sigma^2_n$, this can be formulated as follows.

[Expression (8)]

$$\varepsilon_n(y^*) \sim \mathcal{N}(0, \sigma_n^2) \quad (8)$$

Here, an inverse number $1/\sigma^2_n$ of the variance can be considered as a quantified degree of confidence for the estimated value based on the n-th feature. Given $1/\sigma^2_n > 1/\sigma^2_m$, it can be said that the n-th feature has a higher degree of confidence than the m-th feature.

Here, how to aggregate the estimation results obtained from N different features is discussed. Assuming that each of the estimation errors of $\varepsilon_n$ (n=1, ... N) follows the Gaussian distribution of zero mean and variance $\sigma^2_n$, N probability distributions are obtained for the estimated value y as follows.

[Expression (9)]

$$P_n(y) = \mathcal{N}(y_n, \sigma_n^2), n=1, \ldots, N \quad (9)$$

If the estimated values are independent to each other, the joint probability $P_J(y)$, from which N estimation results are obtained, is obtained by calculating a product of the respective probabilities for n where n=1 to N. The joint probability $P_J(y)$ can be obtained by the following expression.

[Expressions (10) and (11)]

$$P_J(y) = \prod_{n=1}^{N} P_n(y) \propto \frac{1}{\sigma_1 \cdots \sigma_N} \exp\left(-\frac{1}{2}\xi^2\right) \quad (10)$$

$$\xi^2 = \sum_{n=1}^{N} \frac{(y - y_n)^2}{\sigma_n^2}. \quad (11)$$

A value y which maximizes the joint probability is a value of maximum likelihood estimation with respect to y. To maximize the joint probability $P_J(y)$ for y in the above expression, $\xi$ may be maximized with respect of y. Therefore, the following expression can be obtained by solving $d\xi^2/dy=0$.

[Expression (12)]

$$y = \frac{1}{\sum_{n=1}^{N} w_n} \sum_{n=1}^{N} w_n y_n, \quad w_n = \frac{1}{\sigma_n^2} \quad (12)$$

Figure 15:
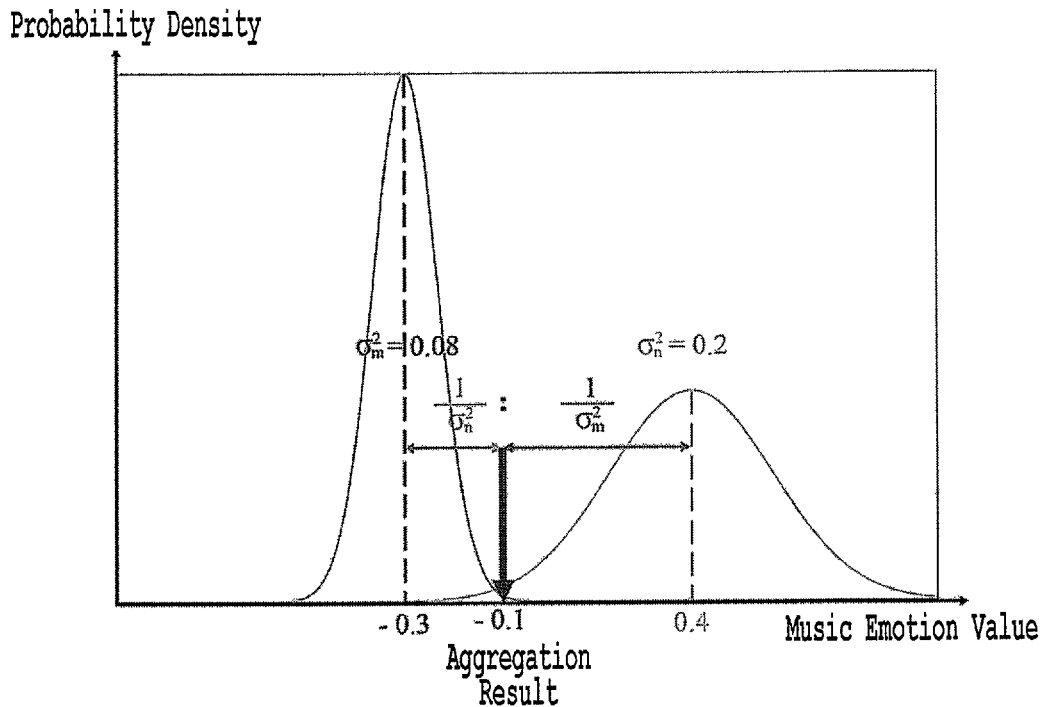
FIG. 15 is used to explain calculation of a weighted mean in the aggregation process of two estimation results.

From the above expression, it is known that the maximum likelihood estimation value used in aggregating N estimation results $y_1, \ldots, y_N$ using the variances $\sigma^2_n, \ldots, \sigma^2_N$ can be obtained as follows: the inverse numbers of the variances $\sigma^2_n, \ldots, \sigma^2_N$, namely, values of the degrees of confidence of $1/\sigma^2_n$ are normalized such that a sum calculated with respect to n=1, ..., N should be 1.0; normalized weights thus obtained are used to obtain a weighted mean. For example, FIG. 15 illustrates that a weighted mean is calculated in aggregating two estimation results. In an example of FIG. 15, one of the estimation results has an estimated value of −0.3 and a variance of 0.08, and the other estimation result has an estimated value of 0.4 and a variance of 0.2, and then an aggregation result of −0.1, which is the maximum likelihood estimation value, is obtained. In FIG. 15, the lateral axis represents the Valence or Arousal value indicative of music emotion, and the longitudinal axis represents the probability density. The aggregation result is calculated as a value of a point that divides internally, by the proportion of an inverse number of the variance, the distance between the two estimated values on the music emotion axis.

In the aggregation, the degrees of confidence obtained from the individual regression models are intactly used as pre-normalized weights in a linear relation. All of the pre-normalized weights are normalized to sum up to one (1). A weighted sum thus obtained is used as a weight. For example, when there is a large variance in features, if a target value is estimated by the regression models using that feature, a variance in estimated values is large, thereby lowering the degree of confidence for the estimated results with respect to the given input. In the above example, however, the degrees of confidence can be calculated for the outputs from the regression models according to the input observation signal, based on the variances in probability distributions of the individual regression models. Then, appropriate weights are added to the estimation results (mean values) obtained from the individual regression models. The estimation results are aggregated as a weighted sum. As a result, an appropriate target value can be obtained. Since the features vary according to the input observation signal, the analysis can be done appropriately by varying the degrees of confidence,

[Robust Aggregation of Estimation Results]

If there is an estimated value having an extremely low degree of confidence, robust estimation can be performed by reducing the frequency of using that estimated value. Namely, if there is an estimated value having a lower degree of confidence than the maximum degree of confidence, the pre-normalized weights are calculated in a non-linear relation, whereby the higher the degrees of confidence obtained from the regression models are, the larger the pre-normalized weights are emphasized to be, and the lower the degrees of confidence obtained from the regression models are, the smaller the pre-normalized weights are emphasized to be. Then, the pre-normalized weights are normalized to sum up to one (1). The normalized result is determined as a weight.

Specifically, prior to the aggregation, if there is an estimated value having an extremely low degree of confidence, more robust estimation can be performed by reducing the frequency of using that estimated value. Assuming that the maximum value for the degree of confidence $W_n$ corresponding to each estimated value is $W_{max}$, it is possible to reduce the frequency of using the estimated value having a lower degree of confidence than the maximum value for the degree of confidence by replacing $W_n$ in the above expression (12) with the following expression.

[Expression (13)]

$$w'_n = \left(\frac{w_n}{w_{max}}\right)^a w_{max}, \quad 1 \leq a \tag{13}$$

Here, "a" denotes a parameter for controlling the frequency. If "a" is increased, the larger a weight calculated from the degree of confidence is, the larger the weight will be transformed to be, and the smaller a weight calculated from the degree of confidence is, the smaller the weight will be transformed to be. Thus, the frequency of using the estimated value having a low degree of confidence is reduced.

For example, assume $(W_1, W_2, W_3, W_4)=(19.0, 17.0, 2.4, 1.6)$. When replacement with $W'_n$ is not performed, a weight is obtained by normalizing these values to sum up to 1.0 as follows.

[Expression (14)]

$$\left(\frac{19.0}{40.0}, \frac{17.0}{40.0}, \frac{2.4}{40.0}, \frac{1.6}{40.0}\right) = (0.475, 0.425, 0.06, 0.04) \tag{14}$$

Figure 16:
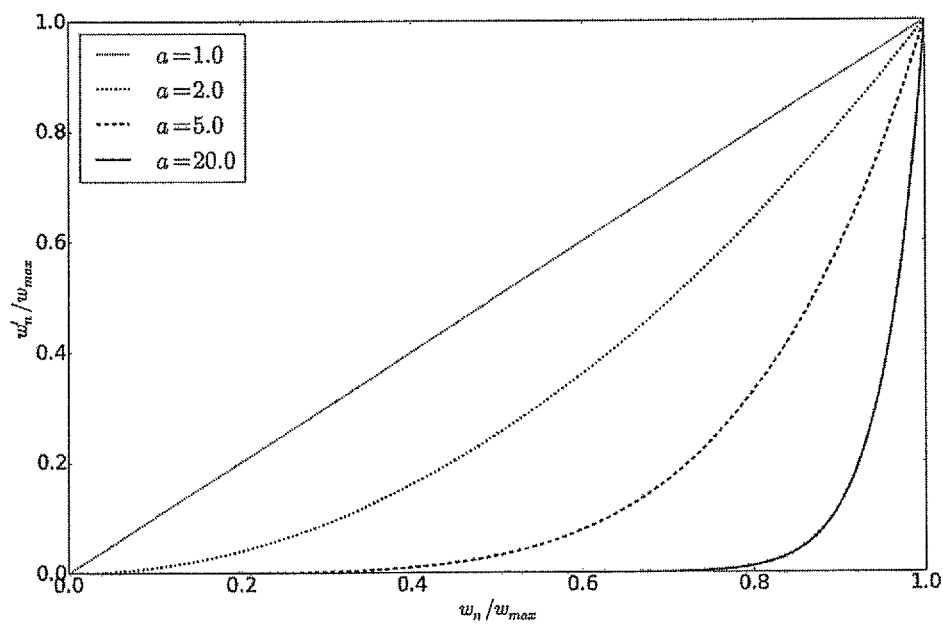
FIG. 16 illustrates an example result of the alternative weights in robust estimation.
Figure 18:
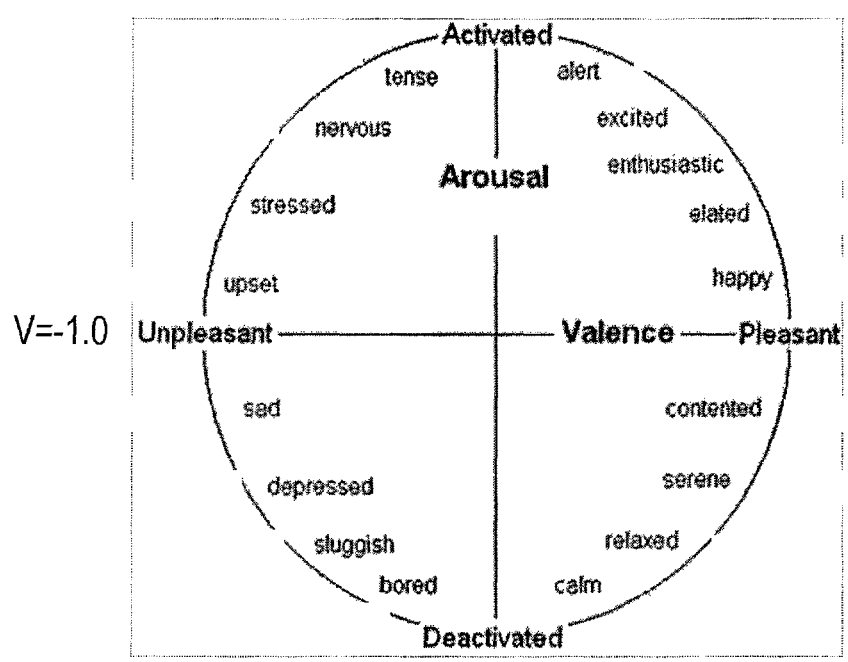
FIG. 18 illustrates an emotion space with two-dimensional coordinates representative of Valence and Arousal values and annotations indicative of emotions corresponding to individual locations in the space.

Next, when more robust estimation is performed, namely, expression (7) is used to replace $W_n$ with $W'_n$ to obtain a weight. FIG. 16 illustrates the relationships of $Wn=W_{max}$ and $W'_n=W_{max}$ as determined by expression (7) for each of a=1.0, 2.0, 5.0, 20.0. It can be known that the smaller a value of "a" is, the smaller a lower value than $W_{max}$ is transformed to be. It can be known that the following effect is attained: the more proximate the weight is to $W_{max}$, the larger the weight will be and the less proximate the weight is to $W_{max}$, the smaller the weight will be since the weight used in aggregating the estimated values is obtained by normalizing the weight $W_n$.

For example, when a=2.0, the degree of confidence is replaced with the following expression.

[Expression (15)]

$$(w'_1, w'_2, w'_3, w'_4) = \tag{15}$$
$$\left(\left(\frac{19.0}{19.0}\right)^2 19.0, \left(\frac{17.0}{19.0}\right)^2 19.0, \left(\frac{2.4}{19.0}\right)^2 19.0, \left(\frac{1.6}{19.0}\right)^2 19.0\right) =$$
$$(19.0, 15.2, 0.30, 0.13)$$

The weight of $(0.55, 0.44, 8.7\times10^{-3}, 3.9\times10^{-3})$ is obtained by normalizing these values to sum up to 1.0.

As the weights thus obtained are compared with the pre-normalized weights of (0.475, 0.425, 0.06, 0.04), the relatively large weights of 0.475 and 0.425 are transformed respectively to larger weights of 0.55 and 0.44. The other relatively small weights of 0.06 and 0.04 are transformed respectively to smaller weights of $8.7\times10^{-3}$ and $3.9\times10^{-3}$. Thus, a large pre-normalized weight can be transformed to a larger weight and a small pre-normalized weight can be transformed to a smaller weight.

Likewise, when a=(1.0, 5.0, 20.0, 50.0), the transform results are as follows:

$a=1.0(0.475,0.425,0.06,0.04)$, $a=2.0(0.55,0.44,8.7\times10^{-3},3.9\times10^{-3})$, $a=5.0(0.64,0.36,2.0\times10^{-5},2.7\times10^{-6})$, $a=20.0(0.90,0.09,9.7\times10^{-19},2.9\times10^{-22})$, and $a=50.0(0.99,0.003,1.2\times10^{-45},1.8\times10^{-54})$.

From the foregoing, it can be known that when "a" is large enough, the weight is obtained only when the degree of confidence is maximal; and in other cases, the weight will be as close to 0.0 as possible. This substantially means that an aggregation result is defined to be an estimated value having the maximum degree of confidence in aggregating the estimation results. When a=1.0, the weight coincides with the weight obtained when the transform of expression (14) is not performed.

It follows from the foregoing that the following calculation is effective: the pre-normalized weights are calculated in a non-linear relation, whereby the higher the degrees of confidence obtained from the regression models are, the larger the pre-normalized weights are emphasized to be, and the lower the degrees of confidence obtained from the regression models are, the smaller the pre-normalized weights are emphasized to be; and a weight is defined to be a normalized result by normalizing the pre-normalized weights to sum up to one (1).

[Performance Evaluation of Music Emotion Recognition]

Now, the following sections will verify the effectiveness of aggregating the estimation results, based on the degrees of confidence. Experiments were made to estimate VA values of a music audio signal having a length of 30 seconds. Here, the experiments were made under different conditions to compare the performance of music emotion recognition.

The experiments were made under the following three different conditions to compare the performance of music emotion recognition.

(1) Aggregation based on the degrees of confidence obtained by a plurality of Gaussian process regression models (the embodiment of the present invention discussed so far), (2) Aggregation using fixed weights obtained by a plurality of Gaussian process regression models using fixed weights, and (3) No aggregation of estimation results and Use of a single Gaussian process regression model.

In the experiments, first, acoustic features were extracted from a music audio signal. Short-time Fourier transform was performed on the music audio signal. The acoustic features were calculated for each frame. The comparison experiments used the features obtained by the following method that won the first prize in the competition of music emotion recognition in the MediaEval Emotion in Music task in 2014. This method is described in [E. Coutinho, F. Weninger, B. Schuller, and K. R. Scherer, "The Munich LSTM-RNN approach to the MediaEval 2014 'Emotion in Music' task," in Proceedings of MediaEval 2014 Workshop, 2014]. The features include zero-cross rate, RMS (root-mean-squared amplitude), spectral features, pitch, and MFCC (Mel-Frequency Cepstral Coefficients). In the comparison experiments, the feature values were gathered into one vector and a 6373-dimensional feature vector was constructed. Next, the Gaussian process regression models were trained. In the comparison experiments, the 6373-dimensional feature vector was divided into three according to the nature of features. First, the spectral features were gathered. Second, the MFCC features were gathered. Third, other features were gathered. To train the Gaussian process regression models, Emotion in Music Database [M. Soleymani, M. N. Caro, and E. M. Schmidt, "1000 songs for emotional analysis of music," in Proceedings of CroudMM 2013. ACM, 2013.27] was used as training data. The database included music audio signals of 744 pieces of music. The music audio signals used in the experiments were annotated with VA values on a scale of one (1) to nine (9). Prior to using the Gaussian process regression models, the VA values were normalized in a scale of −1.0 to 1.0. Randomly selected 619 pieces of music were used in training the regression models, and the remaining 125 pieces of music were as the ground truth values in evaluating the performance. The parameters for the Gaussian process regression models were optimized using the method of Constrained Optimization BY Linear Approximation (COBYLA).

Finally, the estimated values obtained from the individual regression models were aggregated, based on the degrees of confidence, to obtain the VA values. The estimated values were normalized such that the sum of the values should be one (1) to obtain a weight that is proportional to an inverse number of the variance. The weighted sum of the weighted estimated values respectively obtained from the regression models was calculated. The value of the weight sum was determined as the estimation result.

In the experimental condition (2) of the comparison method, the estimated values added with fixed weights were aggregated. For this purpose, the training data (619 pieces of music) were divided into two groups, 309 pieces and 310 pieces. With use of the former group, the Gaussian process regression models were trained for every feature. With use of the latter group as the ground truth data, multivariate regression analysis was performed between the estimated values obtained from the Gaussian process regression models and the ground truth data. Then, the weighted sum of the estimation results from the respective regression models was calculated using the thus obtained coefficients. The weighted sum thus calculated was determined as the estimation result. In the experimental condition (3), the entirety of 6373-dimensional vector was used as a feature vector and the Gaussian process regression model was trained. An estimated value obtained by the Gaussian process regression model was determined as an estimation result as it is.

As the indices for performance evaluation, the R-squared value ($R^2$) and the root-mean-squared error (RMSE) were used. These indices are those used as formal performance indices in the MediaVal Emotion in Music task. There are several definitions for $R^2$. The experiments employed the definition used for evaluation in the study of the existing music emotion recognition, [K. Markov and T. Matsui, "Music genre and emotion recognition using Gaussian process," IEEE Access, vol. 2, pp. 688-697, June 2014].

The experiments have proved that the aggregation of estimation results based on the degrees of confidence improves the performance of music emotion recognition. FIG. 17 illustrates the evaluation results. FIG. 17 compares the estimation results of music emotion recognition when the aggregation of the estimation results based on the degrees of confidence was employed and when it was not employed. The music audio signal and VA values used in the experiments were those employed in the competition of music emotion recognition algorithm, the MediaEval 2013 Emotion in Music. The evaluation indices employed in the experiments were those employed in the above-mentioned competition. The data were divided by the 10-fold cross-validation method into two groups, training data and evaluation data to perform the training of the regression models and evaluation. In FIG. 17, the upper row shows the estimation performance of Arousal values and the lower row shows the estimation performance of Valence values.

In either of the Valence values and the Arousal values, the best performance was attained when the estimation results based on the degrees of confidence were aggregated. Compared with when the estimation results based on fixed weighting were aggregated, improvements of 2.7% and 4.0% were observed respectively for the Valence estimation and the Arousal estimation. For estimation of the Arousal values, both the methods that performed the aggregation of estimated values attained higher performance than the method using a single Gaussian process regression model. For estimation of the Valence values, improvements of performance were observed only in the method performing the aggregation based on the degrees of confidence, compared with the single Gaussian process regression model was used.

From the experiments, it has been confirmed that high performance of music emotion recognition was attained by the aggregation of estimation results based on the degrees of confidence. It has also been confirmed that according to the present invention, the performance of music emotion recognition could be improved by using the regression models that obtain the estimation results and the degrees of confidence, based on the probability distributions and aggregating the estimation results from the regression models, based on the degrees of confidence, as compared with when the present invention is not applied.

[Kind of Observation Signals]

In the embodiment described so far, the music audio signal is used as an observation signal. The present invention may be directed to any kind of signals other than the music audio signal. The present invention may be applied to any kind of signal for the purpose of analyzing a target value obtained by aggregating information on different kinds of observed values (estimation results). The present invention is applicable, for example, to estimation of crop yields of agricultural products whereby meteorological information such as the temperature and rainfall is used as an observation signal; estimation of real estate prices whereby the information such as the site area and the distance from the nearest station is used as an observation signal; and estimation of the morbidity probability such as different kinds of measurement data such as the blood pressure, cardiac sound, and the number of leukocytes are used as an observation signal.

INDUSTRIAL APPLICABILITY

The present invention provides a system, a method, and a computer program for estimation of a target value that can change the aggregation of estimation results based on the degrees of confidence, taking the nature of an input observation signal into consideration.

DESCRIPTION OF REFERENCE NUMERALS

1 Estimator Configuring Section
2 Regression Model Creating Section
21 to 2n Regression Models
3 Feature Extracting Section
4 Estimator
5 Degree-of-Confidence Calculating Section
6 Weight Calculating Section
7 Weighted-Sum Calculating and Target-Value Estimating Section

The invention claimed is:

1. A system for estimation of target value comprising:
an estimator configuring section operable to extract a plurality of features from each of a plurality of observation signals, and including a plurality of regression models corresponding to the plurality of features, whereby the regression models are optimized based on a plurality of training data comprised of a pair of the extracted features and target values to be estimated for the plurality of observation signals; and
an estimating section operable to input an unknown observation signal to the estimator configuring section, to estimate a plurality of target values for corresponding features of the unknown observation signal using the plurality of the regression models, and to estimate a target value for the unknown observation signal through aggregation of estimation results of the plurality of target values for the corresponding features of the unknown observation signal, wherein:
the plurality of regression models are each capable of obtaining a probability distribution of estimation results and a degree of confidence;
the estimating section is operable to obtain respective weights to be added to a plurality of estimation results output from the plurality of regression models based on the respective degrees of confidence for the unknown observation signal inputted to the plurality of regression models, and to estimate the target value for the unknown observation signal by performing the aggregation using a weighted sum of the plurality of estimation results output from the plurality of regression models.

2. The system for estimation of target value according to claim 1, wherein:
the estimator configuring section includes:
a feature extracting section operable to extract the plurality of features from each of the plurality of observation signals; and
a regression model creating and storing section operable to create and store the plurality of regression models corresponding to the plurality of features, whereby the regression models are optimized based on the plurality of training data comprised of a pair of the extracted features and target values to be estimated for the plurality of observation signals;
the estimating section includes:
a degree-of-confidence calculating section operable to calculate the degree of confidence for the unknown observation signal inputted to each of the plurality of regression models;
a weight calculating section operable to calculate respective weights to be added to the plurality of estimation results output from the plurality of regression models, based on the calculated degrees of confidence; and
a weighted-sum calculating and target-value estimating section operable to estimate the target value for the unknown observation signal by performing the aggregation using the weighted sum of the plurality of estimation results output from the plurality of regression models.

3. The system for estimation of target value according to claim 2, wherein:
the estimator configuring section and the estimating section are implemented on a computer.

4. The system for estimation of target value according to claim 2, wherein:
the estimator configuring section and the estimating section are each comprised of a plurality of processors and a plurality of memories; and
the feature extracting section, the regression model creating and storing section, the degree-of-confidence calculating section, the weight calculating section, and the weighted-sum calculating and target-value estimating section are each comprised of at least one processor and at least one memory.

5. The system for estimation of target value according to claim 1, wherein:
the observation signal is a music audio signal and the target value for the unknown observation signal is a music emotion value.

6. The system for estimation of target value according to claim 1, wherein:
the regression models are capable of regression by Gaussian process, Kriging method, or Bayesian estimation.

7. The system for estimation of target value according to claim 6, wherein:
the estimation results are calculated for the individual regression models, based on a mean of the probability distributions obtained from the regression models to which the unknown observation signal is input; and the degree of confidence is calculated for the individual regression models, based on a variance of the probability distributions obtained using the regression models.

8. The system for estimation of target value according to claim 1, wherein:

the plurality of features are categorized into a plurality of feature groups; and the regression models are created correspondingly to the plurality of feature groups.

9. The system for estimation of target value according to claim 8, wherein:

the observation signal is a music audio signal and the target value for the unknown observation signal is a music emotion value;

the feature groups include at least a temporal feature group, a spectral feature group, a pitch-related feature group, and an amplitude spectral feature group.

10. The system for estimation of target value according to claim 2, wherein:

the degree-of-confidence calculating section defines the degree of confidence such that the degree of confidence is higher in a region with a smaller variance in the estimation results of the feature groups as obtained using the plurality of regression models, and the degree of confidence is lower in a region with a larger variance in the estimation results.

11. The system for estimation of target value according to claim 2, wherein:

the degree-of-confidence calculating section defines, in a linear relation, the plurality of degrees of confidence obtained from the plurality of regression models as pre-normalized weights, and defines, as the weights, normalized results obtained by normalizing the pre-normalizing weights to sum up to one.

12. The system for estimation of target value according to claim 2, wherein:

the degree-of-confidence calculating section defines, in a nonlinear relation, pre-normalized weights such that the higher the degrees of confidence obtained from the plurality of regression models are, the larger the pre-normalized weights are emphasized to be, and that the lower the degrees of confidence obtained from the plurality of regression models are, the smaller the pre-normalized weights are emphasized to be, and defines, as the weights, normalized results obtained by normalizing the pre-normalizing weights to sum up to one.

13. The system for estimation of target value according to claim 8, wherein:

the estimating section has a function of interpolation of the estimation results according to a proximity of an input value to known input values prepared for the feature groups in the plurality of regression models when the input value is different from the known input values.

14. The system for estimation of target value according to claim 5, wherein:

the music emotion value is a two-dimensional value comprised of valence and arousal; and the estimating section outputs weighted sums of the two-dimensional values estimated by the plurality of regression models as an estimated value for valence and an estimated value for arousal.

15. A method for estimation of target value comprising the steps of:

preparing a plurality of regression models, whereby a plurality of features are extracted from each of a plurality of observation signals; and the regression models correspond to the plurality of features and are optimized based on a plurality of training data comprised of a pair of the extracted features and target values to be estimated for the plurality of observation signals;

inputting an unknown observation signal to the plurality of regression models; and estimating a plurality of target values for the corresponding features of the unknown observation signal, using the plurality of regression models, and estimating a target value for the unknown observation signal through aggregation of estimation results of the plurality of target values for the corresponding features, wherein:

the plurality of regression models are each capable of obtaining a probability distribution of the estimation results and a degrees of confidence; and in the step of estimating, respective weights to be added to a plurality of estimation results output from the plurality of regression models are obtained, based on the respective degrees of confidence for the unknown observation signal inputted to the plurality of regression models, and a target value is estimated for the unknown observation signal by performing the aggregation using a weighted sum of the plurality of estimation results output from the plurality of regression models.

16. A computer program for estimation of target value, recorded in a computer-readable non-transitory recording medium, the computer program being implemented on a computer to execute the steps of:

preparing a plurality of regression models, whereby a plurality of features are extracted from each of a plurality of observation signals; and the regression models correspond to the plurality of features and are optimized based on a plurality of training data comprised of a pair of the extracted features and target values to be estimated for the plurality of observation signals;

inputting an unknown observation signal to the plurality of regression models; and estimating a plurality of target values for the corresponding features of the unknown observation signal, using the plurality of regression models, and estimating a target value for the unknown observation signal through aggregation of estimation results of the plurality of target values for the corresponding features, wherein:

the plurality of regression models are each capable of obtaining a probability distribution of the estimation results and a degrees of confidence; and in the step of estimating, respective weights to be added to a plurality of estimation results output from the plurality of regression models are obtained, based on the respective degrees of confidence for the unknown observation signal inputted to the plurality of regression models, and a target value is estimated for the unknown observation signal by performing the aggregation using a weighted sum of the plurality of estimation results output from the plurality of regression models.

* * * * *